US012483735B2

(12) United States Patent
Guim Bernat

(10) Patent No.: US 12,483,735 B2
(45) Date of Patent: Nov. 25, 2025

(54) METHODS, SYSTEMS, APPARATUS, AND ARTICLES OF MANUFACTURE TO CACHE MEDIA BASED ON SERVICE LEVEL AGREEMENT TYPE

(71) Applicant: Intel Corporation, Santa Clara, CA (US)

(72) Inventor: Francesc Guim Bernat, Barcelona (ES)

(73) Assignee: Intel Corporation, Santa Clara, CA (US)

( * ) Notice: Subject to any disclaimer, the term of this patent is extended or adjusted under 35 U.S.C. 154(b) by 787 days.

(21) Appl. No.: 17/559,909

(22) Filed: Dec. 22, 2021

(65) Prior Publication Data
US 2022/0116669 A1    Apr. 14, 2022

(51) Int. Cl.
*H04N 21/231* (2011.01)
*G06F 12/0802* (2016.01)
*H04N 21/258* (2011.01)

(52) U.S. Cl.
CPC ... *H04N 21/23106* (2013.01); *G06F 12/0802* (2013.01); *H04N 21/25866* (2013.01); *G06F 2212/455* (2013.01)

(58) Field of Classification Search
CPC ........ H04N 21/23106; H04N 21/25866; G06F 12/0802; G06F 2212/455
See application file for complete search history.

(56) References Cited

U.S. PATENT DOCUMENTS

| 5,826,239 | A  | 10/1998 | Du et al. |
| 6,460,082 | B1 | 10/2002 | Lumelsky et al. |
| 7,039,701 | B2 | 5/2006  | Wesley |
| 7,069,318 | B2 | 6/2006  | Burbeck et al. |
| 7,143,139 | B2 | 11/2006 | Burbeck et al. |
| 7,177,929 | B2 | 2/2007  | Burbeck et al. |
| 7,181,536 | B2 | 2/2007  | Burbeck et al. |
| 7,251,689 | B2 | 7/2007  | Wesley |

(Continued)

FOREIGN PATENT DOCUMENTS

| EP | 3545421 B1 | 11/2023 |
| WO | 2018/144060 A1 | 8/2018 |

OTHER PUBLICATIONS

Gezer et al., "An Introduction to Edge Computing and A Real-Time Capable Server Architecture," International Journal on Advances in Intelligent Systems, vol. 11, No. 1 & 2, Jul. 2018, 11 pages.

(Continued)

*Primary Examiner* — Mulugeta Mengesha
(74) *Attorney, Agent, or Firm* — Hanley, Flight & Zimmerman, LLC

(57) ABSTRACT

Methods, apparatus, systems, and articles of manufacture are disclosed to cache media based on service level agreement (SLA) type. An example apparatus includes caching function execution circuitry to evaluate a caching function with (A) a type of an SLA corresponding to a profile associated with a device requesting the media and (B) metadata corresponding to an entry of the cache corresponding to the media, the profile corresponding to an identification (ID). The example apparatus also includes caching policy circuitry to, in response to the caching function indicating that the metadata satisfies the SLA, cause transmission of the entry of the cache to the device that requested the media.

25 Claims, 12 Drawing Sheets

(56) References Cited

U.S. PATENT DOCUMENTS

| | | | |
|---|---|---|---|
| 7,426,730 | B2 | 9/2008 | Mathews et al. |
| 8,522,341 | B2 | 8/2013 | Nochta et al. |
| 9,648,126 | B2 | 5/2017 | Huici et al. |
| 10,348,574 | B2 | 7/2019 | Kulkarni et al. |
| 10,440,096 | B2 | 10/2019 | Sabella et al. |
| 2003/0182394 | A1 | 9/2003 | Ryngler et al. |
| 2003/0229900 | A1 | 12/2003 | Reisman |
| 2011/0307935 | A1* | 12/2011 | Kotecha ............ H04N 21/4331 725/119 |
| 2013/0097309 | A1* | 4/2013 | Ma ........................ H04L 67/02 709/224 |
| 2015/0121371 | A1 | 4/2015 | Gummaraju et al. |
| 2017/0140570 | A1 | 5/2017 | Leibel et al. |

OTHER PUBLICATIONS

Nallur et al., "A Decentralized Self-Adaptation Mechanism For Service-Based Applications in The Cloud," IEEE Transactions on Software Engineering, May 2013, 24 pages.

Yousefpour et al., "All One Needs to Know about Fog Computing and Related Edge Computing Paradigms," Journal of Systems Architecture, Aug. 2018, 49 pages.

Xu et al., "Mobile Edge Computing Enhanced Adaptive Bitrate Video Delivery with Joint Cache and Radio Resource Allocation," IEEE Access, Special Section on Mobile Edge Computing, vol. 5, Aug. 14, 2017, 10 pages.

Sangster et al., "Virtualized Trusted Platform Architecture Specification," Trusted Computing Group, Incorporated, Specification Version 1.0, Revision 0.26, Sep. 27, 2011, 60 pages.

Alexoudi et al., "Optics in Computing: From Photonic Network-On-Chip to Chip-to-Chip Interconnects and Disintegrated Architectures," Journal of Lightwave Technology, vol. 37, No. 2, Jan. 15, 2019, 17 pages.

Kandao, "Kandao Live 8K: 8K 3D VR Live Streaming," Kandao, [https://www.kandaovr.com/kandao-live/] retreived on Oct. 30, 2021, 39 pages.

Voysys, "Teleoperation Overview—Voysys," Voysys AB, [https://www.voysys.se/teleoperation-1] retreived on Oct. 30, 2021, 7 pages.

\* cited by examiner

METHODS, SYSTEMS, APPARATUS, AND ARTICLES OF MANUFACTURE TO CACHE MEDIA BASED ON SERVICE LEVEL AGREEMENT TYPE

FIELD OF THE DISCLOSURE

This disclosure relates generally to edge networking and, more particularly, to methods, systems, apparatus, and articles of manufacture to cache media based on service level agreement type.

BACKGROUND

Edge environments (e.g., an Edge, Fog, multi-access edge computing (MEC), or Internet of Things (IoT) network) enable workload execution (e.g., execution of one or more computing tasks, execution of a machine learning model using input data, etc.) near endpoint devices that request an execution of the workload. Edge environments may include infrastructure, such as an edge platform, that is connected to cloud infrastructure, endpoint devices, and/or additional edge infrastructure via networks such as the Internet. Edge platforms may be closer in proximity to endpoint devices than cloud infrastructure, such as centralized servers.

Figure 1:
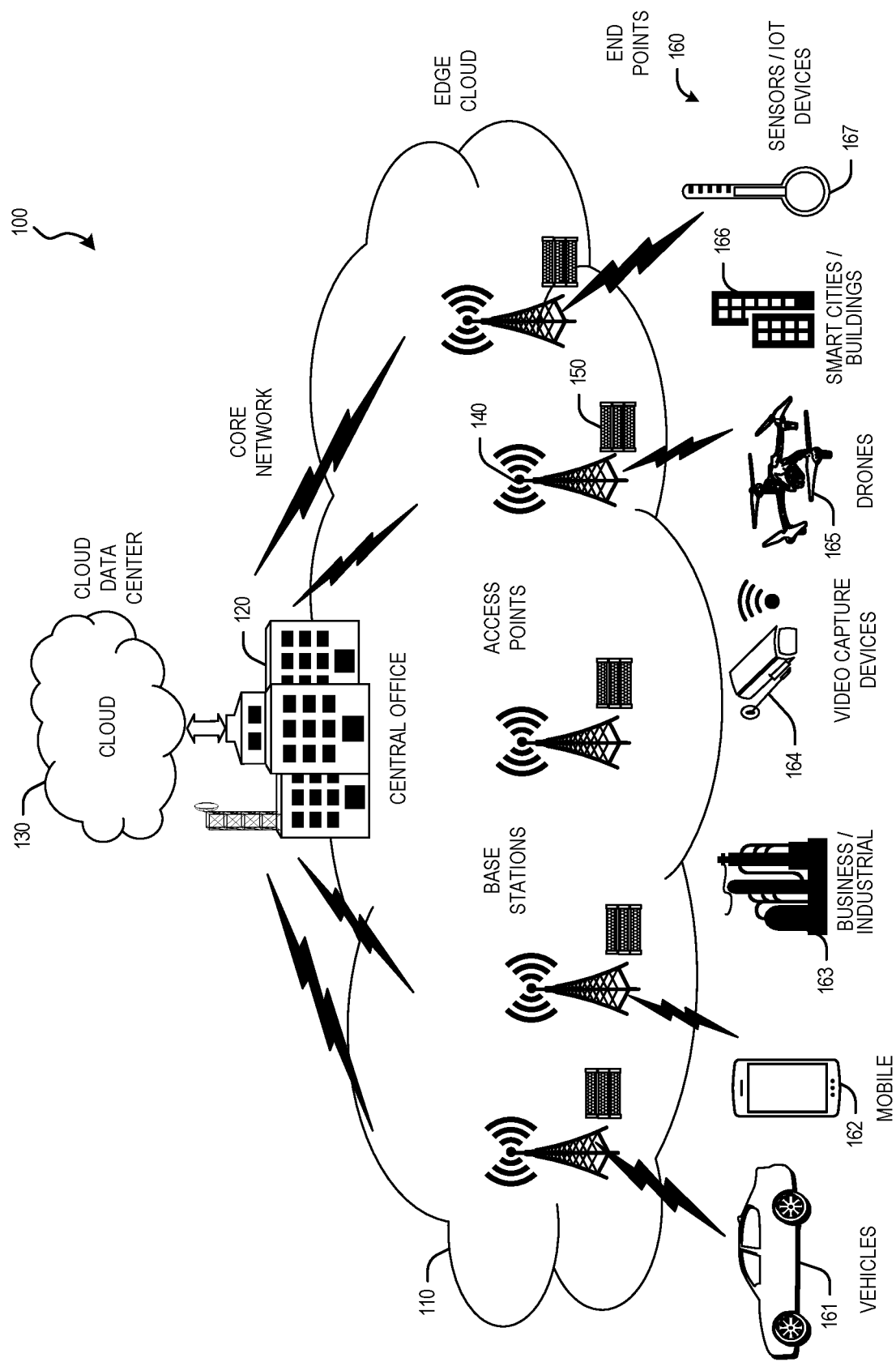
FIG. 1 illustrates an overview of an Edge cloud configuration for Edge computing.

In general, the same reference numbers will be used throughout the drawing(s) and accompanying written description to refer to the same or like parts. The figures are not to scale. As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

As used herein, "approximately" and "about" refer to things that may not be exact due to relatively small differences therebetween. As used herein "real-time" refers to occurrence in a near instantaneous manner recognizing there may be real world delays for computing time, transmission, etc. Thus, unless otherwise specified, "real time" refers to instantaneous occurrence +/−1 milliseconds.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmed with instructions to perform specific operations and including one or more semiconductor-based logic devices (e.g., electrical hardware implemented by one or more transistors). Examples of processor circuitry include programmed microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of the processing circuitry is/are best suited to execute the computing task(s). In some examples, an ASIC refers to Application Specific Integrated Circuitry

DETAILED DESCRIPTION

FIG. 1 is a block diagram 100 showing an overview of a configuration for Edge computing, which includes a layer of processing referred to in many of the following examples as an "Edge cloud". As shown, the Edge cloud 110 is co-located at an Edge location, such as an access point or base station 140, a local processing hub 150, or a central office 120, and thus may include multiple entities, devices, and equipment instances. The Edge cloud 110 is located much closer to the endpoint (consumer and producer) data sources 160 (e.g., autonomous vehicles 161, user equipment 162, business and industrial equipment 163, video capture devices 164, drones 165, smart cities and building devices 166, sensors and IoT devices 167, etc.) than the cloud data center 130. Compute, memory, and storage resources that are offered at the edges in the Edge cloud 110 are critical to providing ultra-low latency response times for services and functions used by the endpoint data sources 160 as well as reducing network backhaul traffic from the Edge cloud 110 toward the cloud data center 130 thus improving energy consumption and overall network usages among other benefits.

Compute, memory, and storage are scarce resources, and generally decrease depending on the Edge location (e.g., fewer processing resources being available at consumer endpoint devices, than at a base station, than at a central office). However, the closer that the Edge location is to the endpoint (e.g., user equipment (UE)), the more that space and power is often constrained. Thus, Edge computing attempts to reduce the amount of resources needed for network services, through the distribution of more resources that are located closer both geographically and in network access time. In this manner, Edge computing attempts to bring the compute resources to the workload data where appropriate, or to bring the workload data to the compute resources.

The following describes aspects of an Edge cloud architecture that covers multiple potential deployments and addresses restrictions that some network operators or service providers may have in their own infrastructures. These include, variation of configurations based on the Edge location (because edges at a base station level, for instance, may have more constrained performance and capabilities in a multi-tenant scenario); configurations based on the type of compute, memory, storage, fabric, acceleration, or like resources available to Edge locations, tiers of locations, or groups of locations; the service, security, and management and orchestration capabilities; and related objectives to achieve usability and performance of end services. These deployments may accomplish processing in network layers that may be considered as "near Edge," "close Edge," "local Edge," "middle Edge," or "far Edge" layers, depending on latency, distance, and timing characteristics.

Edge computing is a developing paradigm where computing is performed at or closer to the "Edge" of a network, typically through the use of a compute platform (e.g., x86 or ARM compute hardware architecture) implemented at base stations, gateways, network routers, or other devices that are much closer to endpoint devices producing and consuming the data. For example, Edge gateway servers may be equipped with pools of memory and storage resources to perform computation in real-time for low latency use-cases (e.g., autonomous driving or video surveillance) for connected client devices. Or as an example, base stations may be augmented with compute and acceleration resources to directly process service workloads for connected user equipment, without further communicating data via backhaul networks. Or as another example, central office network management hardware may be replaced with standardized compute hardware that performs virtualized network functions and offers compute resources for the execution of services and consumer functions for connected devices. Within Edge computing networks, there may be scenarios in services in which the compute resource will be "moved" to the data, as well as scenarios in which the data will be "moved" to the compute resource. Or as an example, base station compute, acceleration and network resources can provide services in order to scale to workload demands on an as needed basis by activating dormant capacity (subscription, capacity on demand) in order to manage corner cases, emergencies, or to provide longevity for deployed resources over a significantly longer implemented lifecycle.

Figure 2:
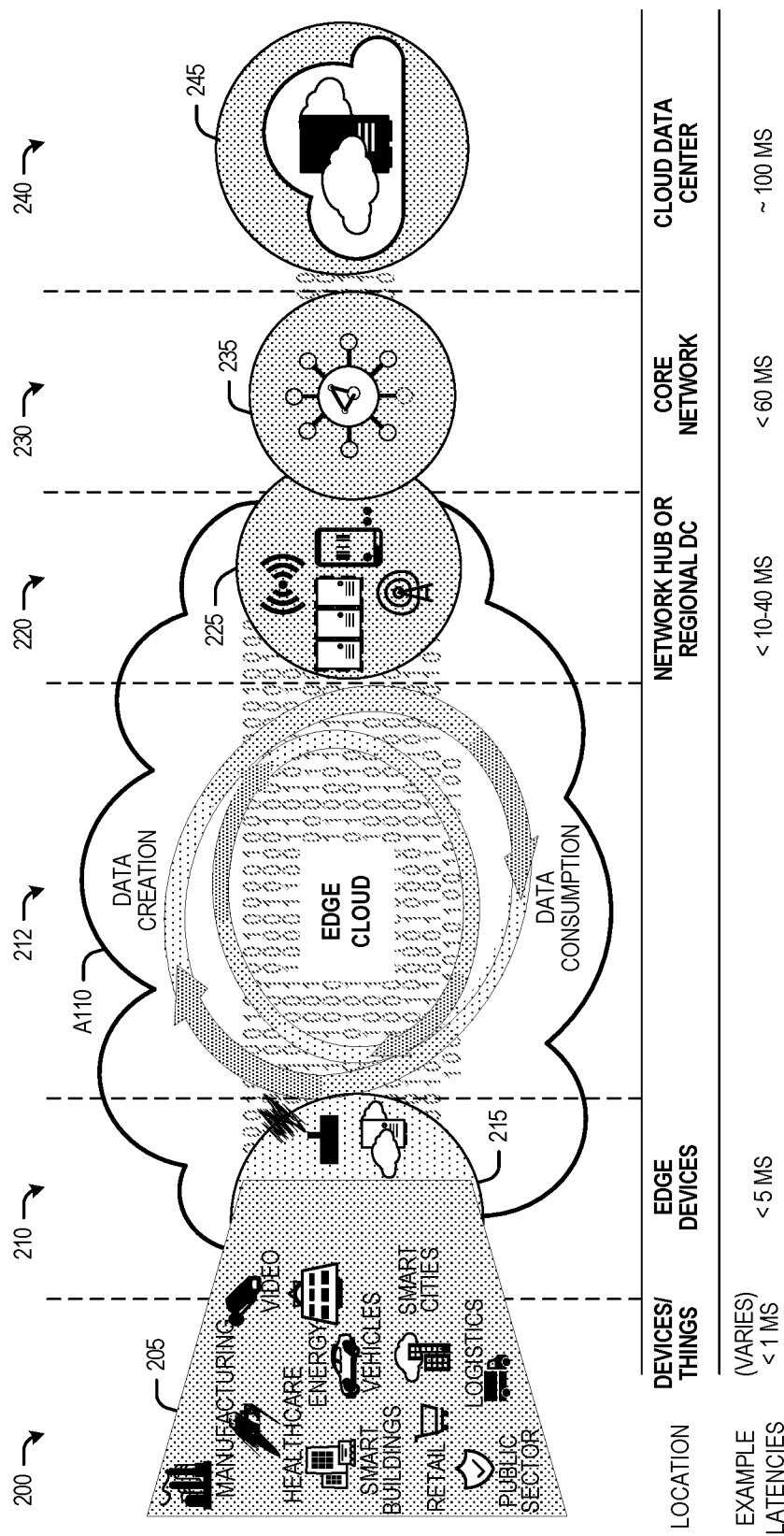
FIG. 2 illustrates operational layers among endpoints, an Edge cloud, and cloud computing environments.

FIG. 2 illustrates operational layers among endpoints, an Edge cloud, and cloud computing environments. Specifically, FIG. 2 depicts examples of computational use cases 205, utilizing the Edge cloud 110 among multiple illustrative layers of network computing. The layers begin at an endpoint (devices and things) layer 200, which accesses the Edge cloud 110 to conduct data creation, analysis, and data consumption activities. The Edge cloud 110 may span multiple network layers, such as an Edge devices layer 210 having gateways, on-premise servers, or network equipment (nodes 215) located in physically proximate Edge systems; a network access layer 220, encompassing base stations, radio processing units, network hubs, regional data centers (DC), or local network equipment (equipment 225); and any equipment, devices, or nodes located therebetween (in layer 212, not illustrated in detail). The network communications within the Edge cloud 110 and among the various layers may occur via any number of wired or wireless mediums, including via connectivity architectures and technologies not depicted.

Examples of latency, resulting from network communication distance and processing time constraints, may range from less than a millisecond (ms) when among the endpoint layer 200, under 5 ms at the Edge devices layer 210, to even between 10 to 40 ms when communicating with nodes at the network access layer 220. Beyond the Edge cloud 110 are core network 230 and cloud data center 240 layers, each with increasing latency (e.g., between 50-60 ms at the core network layer 230, to 100 or more ms at the cloud data center layer 240). As a result, operations at a core network data center 235 or a cloud data center 245, with latencies of at least 50 to 100 ms or more, will not be able to accomplish many time-critical functions of the use cases 205. Each of these latency values are provided for purposes of illustration and contrast; it will be understood that the use of other access network mediums and technologies may further reduce the latencies. In some examples, respective portions of the network may be categorized as "close Edge," "local Edge," "near Edge," "middle Edge," or "far Edge" layers, relative to a network source and destination. For instance, from the perspective of the core network data center 235 or a cloud data center 245, a central office or content data network may be considered as being located within a "near Edge" layer ("near" to the cloud, having high latency values when communicating with the devices and endpoints of the use cases 205), whereas an access point, base station, on-premise server, or network gateway may be considered as located within a "far Edge" layer ("far" from the cloud, having low latency values when communicating with the devices and endpoints of the use cases 205). It will be understood that other categorizations of a particular network layer as constituting a "close," "local," "near," "middle," or "far" Edge may be based on latency, distance, number of network hops, or other measurable characteristics, as measured from a source in any of the network layers 200-240.

The various use cases 205 may access resources under usage pressure from incoming streams, due to multiple services utilizing the Edge cloud. To achieve results with low latency, the services executed within the Edge cloud 110 balance varying requirements in terms of: (a) Priority (throughput or latency) and Quality of Service (QoS) (e.g., traffic for an autonomous car may have higher priority than a temperature sensor in terms of response time requirement; or, a performance sensitivity/bottleneck may exist at a compute/accelerator, memory, storage, or network resource, depending on the application); (b) Reliability and Resiliency (e.g., some input streams need to be acted upon and the traffic routed with mission-critical reliability, where as some other input streams may tolerate an occasional failure, depending on the application); and (c) Physical constraints (e.g., power, cooling, and form-factor, etc.).

The end-to-end service view for these use cases involves the concept of a service-flow and is associated with a transaction. The transaction details the overall service requirement for the entity consuming the service, as well as the associated services for the resources, workloads, workflows, and business functional and business level requirements. The services executed with the "terms" described may be managed at each layer in a way to assure real-time, and runtime contractual compliance for the transaction during the lifecycle of the service. When a component in the transaction is missing its agreed to Service Level Agreement (SLA), the system as a whole (components in the transaction) may provide the ability to (1) understand the impact of the SLA violation, and (2) augment other components in the system to resume overall transaction SLA, and (3) implement steps to remediate.

Thus, with these variations and service features in mind, Edge computing within the Edge cloud 110 may provide the ability to serve and respond to multiple applications of the use cases 205 (e.g., object tracking, video surveillance, connected cars, etc.) in real-time or near real-time, and meet ultra-low latency requirements for these multiple applications. These advantages enable a whole new class of applications (e.g., Virtual Network Functions (VNFs), Function as a Service (FaaS), Edge as a Service (EaaS), standard processes, etc.), which cannot leverage conventional cloud computing due to latency or other limitations.

However, with the advantages of Edge computing comes the following caveats. The devices located at the Edge are often resource constrained and therefore there is pressure on usage of Edge resources. Typically, this is addressed through the pooling of memory and storage resources for use by multiple users (tenants) and devices. The Edge may be power and cooling constrained and therefore the power usage needs to be accounted for by the applications that are consuming the most power. There may be inherent power-performance tradeoffs in these pooled memory resources, as many of them are likely to use emerging memory technologies, where more power requires greater memory bandwidth. Likewise, improved security of hardware and root of trust trusted functions are also required, because Edge locations may be unmanned and may even need permissioned access (e.g., when housed in a third-party location). Such issues are magnified in the Edge cloud 110 in a multi-tenant, multi-owner, or multi-access setting, where services and applications are requested by many users, especially as network usage dynamically fluctuates and the composition of the multiple stakeholders, use cases, and services changes.

At a more generic level, an Edge computing system may be described to encompass any number of deployments at the previously discussed layers operating in the Edge cloud 110 (network layers 200-240), which provide coordination from client and distributed computing devices. One or more Edge gateway nodes, one or more Edge aggregation nodes, and one or more core data centers may be distributed across layers of the network to provide an implementation of the Edge computing system by or on behalf of a telecommunication service provider ("telco", or "TSP"), internet-of-things service provider, cloud service provider (CSP), enterprise entity, or any other number of entities. Various implementations and configurations of the Edge computing system may be provided dynamically, such as when orchestrated to meet service objectives.

Consistent with the examples provided herein, a client compute node may be embodied as any type of endpoint component, device, appliance, or other thing capable of communicating as a producer or consumer of data. Further, the label "node" or "device" as used in the Edge computing system does not necessarily mean that such node or device operates in a client or agent/minion/follower role; rather, any of the nodes or devices in the Edge computing system refer to individual entities, nodes, or subsystems which include discrete or connected hardware or software configurations to facilitate or use the Edge cloud 110.

As such, the Edge cloud 110 is formed from network components and functional features operated by and within Edge gateway nodes, Edge aggregation nodes, or other Edge compute nodes among network layers 210-230. The Edge cloud 110 thus may be embodied as any type of network that provides Edge computing and/or storage resources that are proximately located to radio access network (RAN) capable endpoint devices (e.g., mobile computing devices, IoT devices, smart devices, etc.), which are discussed herein. In other words, the Edge cloud 210 may be envisioned as an "Edge" which connects the endpoint devices and traditional network access points that serve as an ingress point into service provider core networks, including mobile carrier networks (e.g., Global System for Mobile Communications (GSM) networks, Long-Term Evolution (LTE) networks, 5G/6G networks, etc.), while also providing storage and/or compute capabilities. Other types and forms of network access (e.g., Wi-Fi, long-range wireless, wired networks including optical networks, etc.) may also be utilized in place of or in combination with such 3GPP carrier networks.

The network components of the Edge cloud 210 may be servers, multi-tenant servers, appliance computing devices, and/or any other type of computing devices. For example, the Edge cloud 210 may include an appliance computing device that is a self-contained electronic device including a housing, a chassis, a case, or a shell. In some circumstances, the housing may be dimensioned for portability such that it can be carried by a human and/or shipped. Example housings may include materials that form one or more exterior surfaces that partially or fully protect contents of the appliance, in which protection may include weather protection, hazardous environment protection (e.g., electromagnetic interference (EMI), vibration, extreme temperatures, etc.), and/or enable submergibility. Example housings may include power circuitry to provide power for stationary and/or portable implementations, such as alternating current (AC) power inputs, direct current (DC) power inputs, AC/DC converter(s), DC/AC converter(s), DC/DC converter(s), power regulators, transformers, charging circuitry, batteries, wired inputs, and/or wireless power inputs. Example housings and/or surfaces thereof may include or connect to mounting hardware to enable attachment to structures such as buildings, telecommunication structures (e.g., poles, antenna structures, etc.), and/or racks (e.g., server racks, blade mounts, etc.). Example housings and/or surfaces thereof may support one or more sensors (e.g., temperature sensors, vibration sensors, light sensors, acoustic sensors, capacitive sensors, proximity sensors, infrared or other visual thermal sensors, etc.). One or more such sensors may be contained in, carried by, or otherwise embedded in the surface and/or mounted to the surface of the appliance. Example housings and/or surfaces thereof may support mechanical connectivity, such as propulsion hardware (e.g., wheels, rotors such as propellers, etc.) and/or articulating hardware (e.g., robot arms, pivotable appendages, etc.). In some circumstances, the sensors may include any type of input devices such as user interface hardware (e.g., buttons, switches, dials, sliders, microphones, etc.). In some circumstances, example housings include output devices contained in, carried by, embedded therein and/or attached thereto. Output devices may include displays, touchscreens, lights, light-emitting diodes (LEDs), speakers, input/output (I/O) ports (e.g., universal serial bus (USB)), etc. In some circumstances, Edge devices are devices presented in the network for a specific purpose (e.g., a traffic light), but may have processing and/or other capacities that may be utilized for other purposes. Such Edge devices may be independent from other networked devices and may be provided with a housing having a form factor suitable for its primary purpose; yet be available for other compute tasks that do not interfere with its primary task. Edge devices include Internet of Things devices. The appliance computing device may include hardware and software components to manage local issues such as device temperature, vibration, resource utilization, updates, power issues, physical and network security, etc. Example hardware for implementing an appliance computing device is described in conjunction with FIG. 6. The video streaming platforms are small deployments where one or a few 360° cameras are utilized to collect 360° images and send the 360° images to a server that stitches the 360° images together for users accessing the 360° streams. However, as 360° real-time video streaming gains popularity, platforms will soon be implementing 10s to 100s of 360° cameras with thousands or hundreds of thousands of users.

One such large use case involves implementing 360° real-time video streaming in stadiums and/or sport venues. For example, 360° cameras can be implemented at the field level in the Barcelona stadium, Camp Nou. Another example includes implementing 360° cameras during live musical performances. Additionally, an example includes implementing 360° cameras in Formula 1® driver's helmets at the Dubai Formula 1 circuit. Further examples include implementing 360° cameras at National Football League games, National Basketball Association games, Major League Soccer games, among others. In such examples, the QoS associated with accessing the 360° real-time video streams may differ based on the type of profile a user has purchased, subscribed to, and/or is otherwise accessing. For example, different types of profiles include Very Important Person (VIP) profiles, platinum profiles, gold profiles, silver profiles, and standard profiles and correspond to different SLAs. As such, a user profile has a type of SLA (e.g., VIP, platinum, gold, silver, standard, etc.). User profiles are generally defined by different: quality of the stream (e.g., 1080 vs 4K vs 8K, etc.), how close to real-time the stream is (e.g., real-time, sub 2 seconds, sub 3 seconds, etc.), how many frames per second, etc.

360° cameras include a variety of resolutions and frame rates. For example, Table 1 illustrates example resolutions, frame rates, and other parameters of the KanDao® Obsidian R 360° camera.

TABLE 1

| | |
|---|---|
| Photo Format | JPG/DNG |
| Weight (Camera and Battery) | 1.1 kg |
| Recording Media | Micro SD/SDHC/SDXC cards, U3(USH-I) cards are recommended |
| Video Coding Format | H.264/H.265 |
| Input Voltage | 12 V |
| Working Temperature | 0~30° C. |
| Working Humidity | 10~90% RH |
| Storage Temperature | −40~80° C. |
| Storage Humidity | 5~90% RH |
| ISO Range | 100~3200 |
| Video Resolution/Frame Rate (FPS)/Single-lens Resolution | 8k × 8k/30 fps/3800 × 3000    6k × 6k/50 fps/3000 × 2160<br>4k × 4k/60 fps/1900 × 1500    6k × 6k/30 fps/3000 × 3000<br>                                                          4k × 4k/120 fps/1500 × 1080<br>                                                          4k × 4k/80 fps/1500 × 1500 |

Edge cloud 110 may also include one or more servers and/or one or more multi-tenant servers. Such a server may include an operating system and implement a virtual computing environment. A virtual computing environment may include a hypervisor managing (e.g., spawning, deploying, commissioning, destroying, decommissioning, etc.) one or more virtual machines, one or more containers, etc. Such virtual computing environments provide an execution environment in which one or more applications and/or other software, code, or scripts may execute while being isolated from one or more other applications, software, code, or scripts.

Real-time content generation and consumption is an emerging computing market that is being targeted for existing and developing Edge deployments. For example, 360 degree (360°) real-time video streaming is a popular use case in this spectrum. While popular, existing 360° real-time The parameters in Table 1, and in particular, the different spectrum of resolutions and frame rates, indicates that implementing 360° real-time video streaming in large use cases (e.g., stadiums, live musical events, Formula 1, etc.) would require extensive network bandwidth and computational processing resources. For example, such implementations would require large network bandwidth to transmit video and extensive computational resources to stitch images together to deliver results to end users. These resource requirements are not feasible at the scale of such large use cases.

Some existing techniques have attempted to solve this problem. The existing techniques focus on addressing the scalability problem by optimizing the software stack by processing data as the data is stored (e.g., by predicting camera point of view (POV), varying resolution within a POV, compression, etc.) and by implementing complex networking topologies that allow increasing backhaul traffic and available bandwidth to the end user. Other approaches implement inline processing via network interface circuitry that preprocesses data as the data is ingested by the system to generated proper actions. Another existing technique utilizes peer-to-peer processing to allow accelerators to process stored data and generate corresponding data. Existing techniques do not successfully address the scalability problem without excessive power consumption (e.g., on the order of hundreds of kilowatts). Further existing techniques are focused on optimizing the stream provided to each end user. As such, existing techniques are very computationally expensive.

However, existing techniques do not consider that, for different profiles, "approximate" or "similar" to real-time streams satisfy associated qualities of service. Examples disclosed herein improve (e.g., optimize) delivery of real-time content based on qualities of service that different users are associated with depending on the type of profile associated with the users. Examples disclosed herein implement a hierarchical, approximate, and pseudo-real-time content caching architecture based on cached data temporality, approximation and/or other key performance indicators (KPI) that take advantage of the different qualities of services associated with user profiles.

Figure 3:
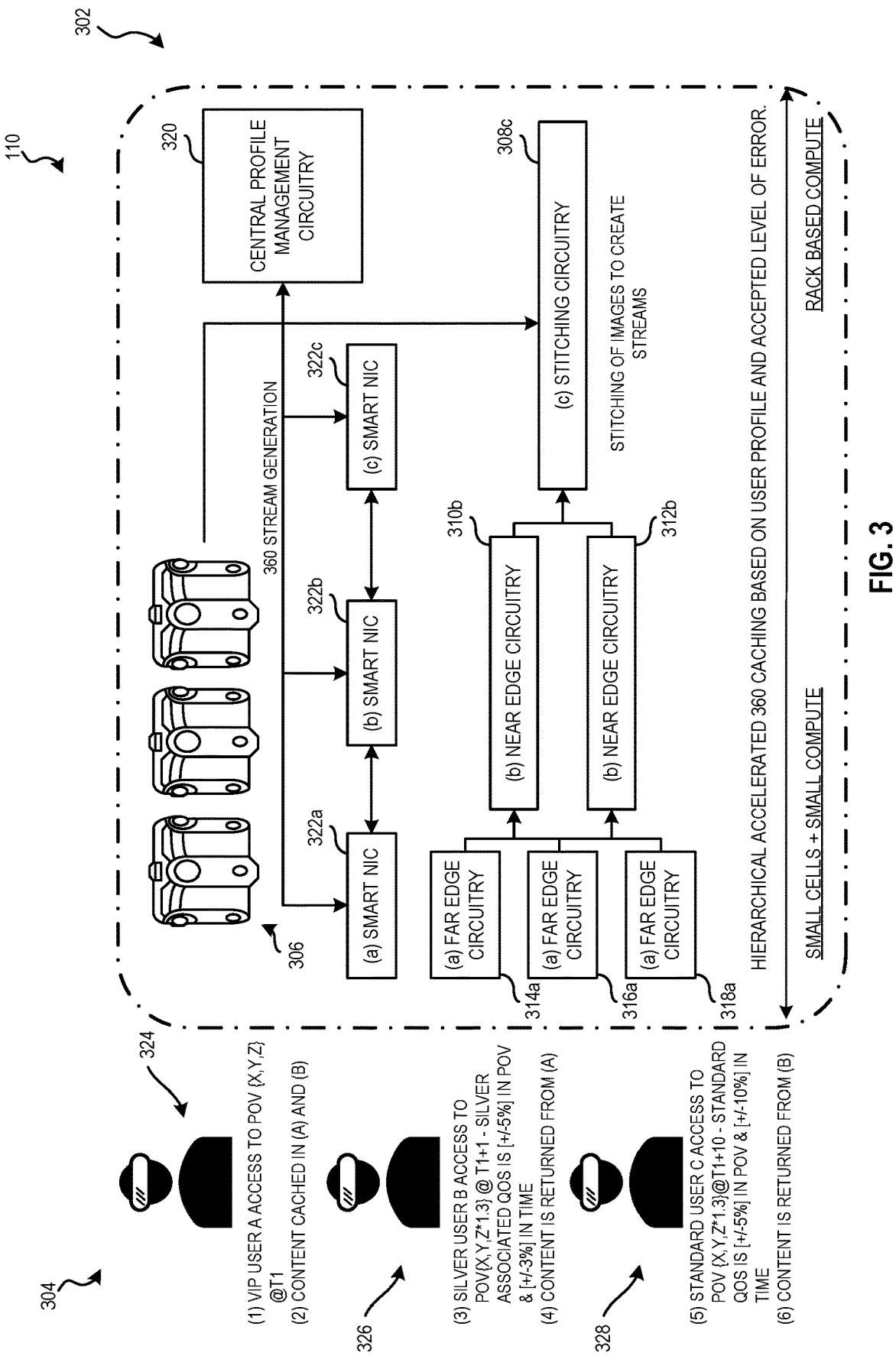
FIG. 3 illustrates an example implementation of the Edge cloud including an example content delivery network serving example end users.

FIG. 3 illustrates an example implementation of the Edge cloud 110 including an example content delivery network (CDN) 302 serving example end users 304. In the example of FIG. 3, the CDN 302 includes one or more example cameras 306 that are to capture real-time content to be delivered to the end users 304 via the CDN 302. The example one or more cameras 306 can be implemented by one or more KanDao® Obsidian R 360° cameras. In some examples, the one or more cameras capture augmented reality (AR) and/or virtual reality (VR) content to be delivered to the end users 304 via the CDN 302.

In the illustrated example of FIG. 3, the example CDN 302 also includes example image stitching circuitry 308c, example first near Edge circuitry 310b, example second near Edge circuitry 312b, example first far Edge circuitry 314a, example second far Edge circuitry 316a, example third far Edge circuitry 318a, and example central profile management circuitry 320. In the example of FIG. 3, the CDN 302 implements a real-time data caching hierarchy that includes three tiers (a, b, and c) where the first tier (a) is physically closest to the end users 304 and the third tier (c) is physically farthest from the end users 304.

In the illustrated example of FIG. 3, the third tier (c) of the CDN 302 includes the image stitching circuitry 308c. The example image stitching circuitry 308c is coupled to the one or more cameras 306, the first near Edge circuitry 310b, and the second near edge circuitry 312b. In the example of FIG. 3, the image stitching circuitry 308c is implemented by processor circuitry such as that included in the network access layer 220 (e.g., base stations, radio processing units, network hubs, regional DCs, local network equipment etc.). In the example of FIG. 3, the image stitching circuitry 308c stitches together images generated by the one or more cameras 306 to create 360° real-time video streams hosted by the CDN 302. For example, to stich images together, the image stitching circuitry 308c combines two or more images with overlapping fields of view to produce a panoramic image. For example, the image stitching circuitry 308c may implements cylindrical projection and/or spherical projection.

In the illustrated example of FIG. 3, the first near Edge circuitry 310b, the second near Edge circuitry 312b, the first far Edge circuitry 314a, the second far Edge circuitry 316a, and the third far Edge circuitry 318a facilitate throughput of the 360° real-time video streams through the CDN 302. In the example of FIG. 3, the first near Edge circuitry 310b and the second near Edge circuitry 312b are coupled to the image stitching circuitry 308c, the first far Edge circuitry 314a, the second far Edge circuitry 316a, and the third far Edge circuitry 318a. In the example, the first near Edge circuitry 310b and the second near Edge circuitry 312b are implemented by processor circuitry. In the example of FIG. 3, the first far Edge circuitry 314a, the second far Edge circuitry 316a, and the third far Edge circuitry 318a are coupled to the first near Edge circuitry 310b and the second near Edge circuitry 312b. The example first far Edge circuitry 314a, the example second far Edge circuitry 316a, and the example third far Edge circuitry 318a are implemented by processor circuitry such as that included in the Edge devices layer 210 (e.g., gateways, on-premise servers, network equipment located in physically proximate Edge systems, etc.).

In the illustrated example of FIG. 3, the first tier (a) of the CDN 302 includes example first smart network interface circuitry (NIC) 322a, the second tier (b) of the CDN 302 includes example second smart network interface circuitry (NIC) 322b, and the third tier (c) of the CDN 302 includes example third smart network interface circuitry (NIC) 322c. In the example of FIG. 3, each of the first smart NIC 322a, the second smart NIC 322b, and the third smart NIC 322c is implemented as a separate device in the first tier (a), the second tier (b), and the third tier (c), respectively. However, in additional or alternative examples, an Edge gateway, accelerator circuitry, and/or an Edge node can implement the functionality of a smart NIC. In some examples, the one or more cameras 306 may include an ASIC or an FPGA to implement the functionality of a smart NIC.

In the illustrated example of FIG. 3, the first smart NIC 322a, the second smart NIC 322b, and the third smart NIC 322c cache content created by the image stitching circuitry 308c. For example, the first smart NIC 322a caches streams generated by content creation services (e.g., the one or more cameras 306) as well as metadata that describes contextual information of that content. For example, for a 360° video stream or video on-demand metadata describing contextual information includes a time when the content was created (e.g., 1:21:30 AM), a resolution of the content, and a point of view (e.g., the camera was oriented to look at coordinates (X, Y, Z)). Other metadata is possible. The first smart NIC 322a also implements one or more caching policies that determine whether content cached at the first smart NIC 322a matches content requested by an end user. For example, the first smart NIC 322a executes and/or instantiates one or more functions that are dependent on a quality of service associated with a requesting user. As such, the first smart NIC 322a implements approximate real-time caching.

In the example of FIG. 3, the central profile management circuitry 320 is implemented by processor circuitry. The example central profile management circuitry 320 is coupled to the first smart NIC 322a, the second smart NIC 322b, and the third smart NIC 322c. The central profile management circuitry 320 maintains a database of user profiles for end users using the CDN 302. For example, the central profile management circuitry 320 maintains user profiles for the end users 304 including an example first end user 324, an example second end user 326, and an example third end user 328. The user profile of the first end user 324 indicates that the first end user 324 is a VIP user whose SLA does not permit deviation from requested settings. For example, if, at time T1, the first end user 324 selects a stream from one of the one or more cameras 306 with a POV of (X, Y, Z), the first smart NIC 322a supplies a stream from a camera having a POV of (X, Y, Z) and no (or the least available) latency.

Additionally, the user profile of the second end user 326 indicates that the second end user 326 is a silver user whose SLA permits deviation from requested POV by +/−5% (e.g., a predefined error range) and deviation from QoS by +/−5% (e.g., a predefined error range). Thus, if, at time T1+1, the second end user 326 selects a stream from one of the one or more cameras 306 with a POV of (X, Y, Z*1.3), the first smart NIC 322a the same stream provided to the first end user 324 as the time deviation and POV deviation are within acceptable thresholds of error.

The user profile of the third end user 328 indicates that the third end user 328 is a standard user whose SLA permits deviation from requested POV by +/−10% (e.g., a predefined error range) and deviation from QoS by +/−5% (e.g., a predefined error range). Thus, if, at time T1+10, the third end user 328 selects a stream from one of the one or more cameras 306 with a POV of (X, Y, Z*1.3), the second smart NIC 322b requests the same stream provided to the first end user 324 as the time deviation and POV deviation are within acceptable thresholds of error.

As such, if an end user's SLA indicates that increasing the delay between real-time of a stream and the time at which the user's device receives the stream, example smart NICs disclosed herein can delay providing a stream to find cached content that is a better match to a user's preferred POV. Further, by actively monitoring deviations from preferred values in a user's SLA, example smart NICs disclosed herein can track the time during which a user's SLA is satisfied and can facilitate billing for that time and/or can facilitate billing at a lower rate during periods when a user's SLA was not satisfied.

Figure 4:
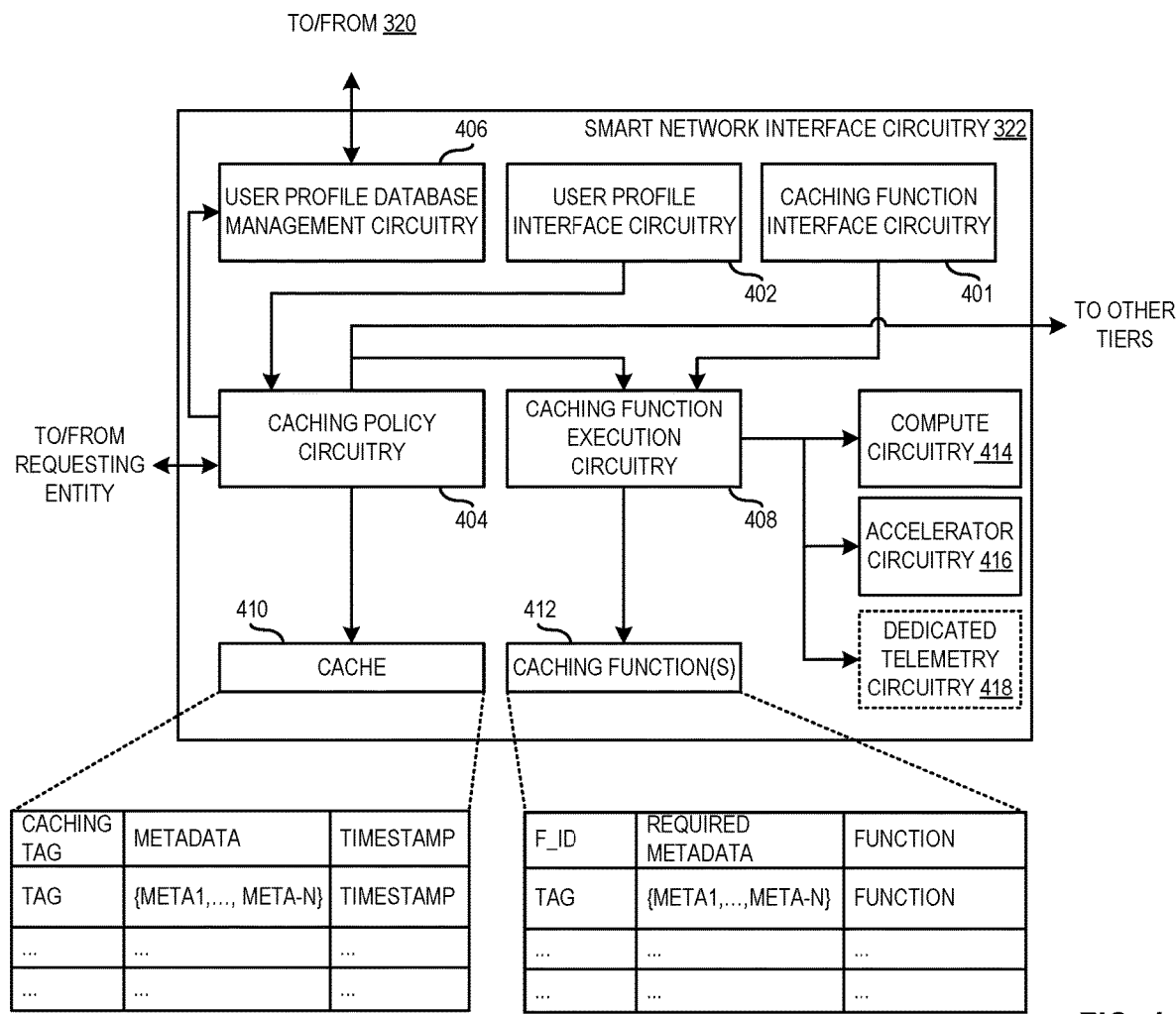
FIG. 4 is a block diagram of an example implementation of the example smart network interface circuitry of FIG. 3.

FIG. 4 is a block diagram of an example implementation of the example smart network interface circuitry (NIC) 322 of FIG. 3 to cache media based on service level agreement type. In the example of FIG. 4, the smart NIC 322 includes example caching function interface circuitry 401, example user profile interface circuitry 402, example caching policy circuitry 404, example user profile database management circuitry 406, example caching function execution circuitry 408, an example cache 410, example caching function storage 412, example compute circuitry 414, and example accelerator circuitry 416. In some examples, the smart NIC 322 includes example dedicated telemetry circuitry 418.

In the example of FIG. 4, the smart NIC 322 may be instantiated (e.g., creating an instance of, bring into being for any length of time, materialize, implement, etc.) by processor circuitry such as a central processing unit executing instructions. Additionally or alternatively, the smart NIC 322 of FIG. 4 may be instantiated (e.g., creating an instance of, bring into being for any length of time, materialize, implement, etc.) by an ASIC or an FPGA structured to perform operations corresponding to the instructions (e.g., corresponding to instructions). It should be understood that some or all of the circuitry of FIG. 4 may, thus, be instantiated at the same or different times. Some or all of the circuitry may be instantiated, for example, in one or more threads executing concurrently on hardware and/or in series on hardware. Moreover, in some examples, some or all of the circuitry of FIG. 4 may be implemented by one or more virtual machines and/or containers executing on the microprocessor.

In the illustrated example of FIG. 4, the example caching function interface circuitry 401 is coupled to the caching function execution circuitry 408. In the example of FIG. 4, the caching function interface circuitry 401 hosts a user interface through which an engineer or developer of the CDN 302 designates a function (e.g., a multi-criteria function) that determines when a request from a device for a particular type of stream matches with data cached at the smart NIC 322 (e.g., in the cache 410). The caching function interface circuitry 401 allows a developer to specify an identification (ID) of the function, the function, and metadata utilized when evaluating the function including a list of contextual inputs expected for the type of stream, and a stream type ID. The stream type ID is a value that identifies one or more types of stream which the function is compatible.

In the example of FIG. 4, the media being cached is 360° videos. As such, the list of contextual inputs expected for the type of stream includes timestamps, quality of content, POV, etc. In some examples, different functions are used depending on a type of the stream. Additionally, different types of streams may have different type of metadata. For example, metadata for 360° videos is different metadata for AR/VR content. Further, examples disclosed herein are applicable to any type of content delivery that has temporal or physical semantics (or any other type of metadata that can be applied to the approximate caching functions). The more density of users and variety across SLA the better the smart NIC 322 will perform.

In the illustrated example of FIG. 4, the example user profile interface circuitry 402 is coupled to the caching policy circuitry 404. The user profile interface circuitry 402 allows an engineer or developer to specify the way that user profile information is accessed. The caching policy circuitry 404 retrieves QoS attached to a user profile. In the example of FIG. 4, the caching policy circuitry 404 is coupled to the user profile interface circuitry 402, the user profile database management circuitry 406, the caching function execution circuitry 408, an entity requesting media (e.g., a device requesting media) cached at the smart NIC 322, and other tiers of the caching hierarchy.

In the illustrated example of FIG. 4, the caching policy circuitry 404 is responsible for processing request from a particular user or user device to access a particular context (e.g., media provided by a particular content generation source). For example, the caching policy circuitry 404 receives a request for a particular stream provided by a particular device or media (e.g., particular IP camera, 360° camera, etc.) from a particular user ID. The caching policy circuitry 404 queries (e.g., request from) a local cache of the user profile database management circuitry 406 to get the description of the user using the attached user ID included with the request.

In the illustrated example of FIG. 4, in response to receipt of a user profile from the user profile database management circuitry 406, the caching policy circuitry 404 extracts a type of the SLA (e.g., a priority according to which the smart NIC 322 is to serve end users) for that particular user and potentially a list of pairs of metadata key performance indicators (KPIs) (e.g., quality, latency, etc.), allowed error range(s) (e.g., for that user, 5% drift on the cached data is permitted). In some examples, the SLA type may include some default values for each of the KPIs. In the example of FIG. 4, KPIs for real-time video streaming include point of view (POV) (e.g., X, Y, and Z-coordinates) of a camera that generated a stream of content requested by a user, delay between the time the camera generated the stream and the time the stream is made available to the user, resolution of the stream (e.g., 8K, 4K, 1080p, 720p, etc.), and the like.

In some examples, in response to receiving a request from another device for media, the caching policy circuitry 404 reviews SLAs associated with devices that previously requested the same media. If a first device requesting media is associated with the same type of SLA (e.g., a VIP type SLA) as a second device that previously requested the same media, the caching policy circuitry 404 can group the first device and the second device (e.g., a VIP group). As such, the caching policy circuitry 404 can make decisions with respect to the group. For example, after serving a first device associated with a first profile having a first ID and corresponding to a first SLA of a type with an entry of the cache 410 corresponding to the requested media, the caching policy circuitry 404 can transmit the entry of the cache 410 to a second device requesting the media in response to determining that the second device is associated with a second profile having a second ID and corresponding to a second SLA of the type.

In the illustrated example of FIG. 4, the user profile database management circuitry 406 is coupled to the caching policy circuitry 404 and the central profile management circuitry 320. In the example of FIG. 4, the user profile database management circuitry 406 searches its local cache for a user profile corresponding to the user ID associated with a device requesting the media. For example, a user ID is implemented as a universally unique identifier (UUID). In some examples, the user profile database management circuitry 406 searches its local database and, in parallel, requests, from the central profile management circuitry 320, the information of that user. In response to failing to identify a user profile associated with the user ID in the local cache of the user profile database management circuitry 406, requests the information of that user from the central profile management circuitry 320.

In the illustrated example of FIG. 4, the caching function execution circuitry 408 is coupled to the caching function interface circuitry 401, the caching policy circuitry 404, the caching function storage 412, the compute circuitry 414, the accelerator circuitry 416, and the dedicated telemetry circuitry 418. The caching function execution circuitry 408 selects entries in the cache 410 that match the requested stream (e.g., based on a tag entry of the cache 410 corresponding to the media). The caching function execution circuitry 408 evaluates the function defined via the caching function interface circuitry 401 with metadata associated with the user and metadata associated with the selected entries of the cache 410. For example, the caching function execution circuitry 408 evaluates the caching function with the type of the SLA, KPI(s), associated error range(s), and metadata of the selected entries of the cache 410. In some examples, a caching function can include reviewing each metadata KPI of a stream type, computing the difference between what is cached and what the user is required per their SLA, and selecting the entry or entries where none of the KPI of the contract is violated.

In the illustrated example of FIG. 4, the caching function execution circuitry 408 determines whether one or more of the selected entries satisfy the caching function. In response to the caching function execution circuitry 408 determining that one or more of the selected entries satisfies the caching function (e.g., in response to the caching function indicating that the metadata of the one or more of the selected entries satisfies the SLA of the device associated with the user profile), the caching function execution circuitry 408 returns a subset of the selected entries that satisfy the caching function. Alternatively, in response to the caching function execution circuitry 408 determining that one or more of the selected entries do not satisfy the caching function, the caching policy circuitry 404 transmits (e.g., causes transmission of) a request including the user ID to a subsequent tier in the cache hierarchy. The next tier in the cache hierarchy may apply the same approach as the smart NIC 322 but other implementations are possible. For example, the next tier may forward the request to a final tier if high latency is permitted. Once the data is received, the caching policy circuitry 404 caches the data and the metadata. Subsequently, the caching policy circuitry 404 transmits (e.g., causes transmission of, is to cause transmission of, etc.) the media to the device that requested it.

In the illustrated example of FIG. 4, from the subset of the selected entries that satisfy the caching function, the caching policy circuitry 404 selects an entry with the least error from the QoS of the user profile. Subsequently, the caching policy circuitry 404 transmits the media to the device that requested it. The smart NIC 322 interacts with a content generator (e.g., a 360° server, real-time video, AR, VR, etc.). In some examples, a content generator is a device such a camera that streams real-time content. The content generator includes metadata associated portions of a stream sent to users. The metadata will depend on the type of streams. As such, the smart NIC 322 is aware of this variability and generates the metadata corresponding to the stream type.

In the illustrated example of FIG. 4, the cache 410 is coupled to the caching policy circuitry 404. The cache 410 may be implemented by L1 cache, L2 cache, L3 cache, or the like. The cache 410 stores an identifier (a caching tag) of the media and associated metadata as well as timestamps (in at least the case of 360° video). The caching function storage 412 is coupled to the caching function execution circuitry 408. In the example of FIG. 4, the caching function storage 412 stores entries for caching function. Example entries include a function ID, the metadata utilized by the function, and the function. The caching function storage 412 may be implemented by a volatile memory (e.g., a Synchronous Dynamic Random-Access Memory (SDRAM), Dynamic Random-Access Memory (DRAM), RAMBUS Dynamic Random-Access Memory (RDRAM), etc.) and/or a non-volatile memory (e.g., flash memory). The caching function storage 412 may additionally or alternatively be implemented by one or more double data rate (DDR) memories, such as DDR, DDR2, DDR3, DDR4, DDR5, mobile DDR (mDDR), DDR SDRAM, etc. The caching function storage 412 may additionally or alternatively be implemented by one or more mass storage devices such as hard disk drive(s) (HDD(s)), compact disk (CD) drive(s), digital versatile disk (DVD) drive(s), solid-state disk (SSD) drive(s), Secure Digital (SD) card(s), CompactFlash (CF) card(s), etc. While in the illustrated example the caching function storage 412 is illustrated as a single database, the caching function storage 412 may be implemented by any number and/or type(s) of databases. Furthermore, the data stored in the caching function storage 412 may be in any data format such as, for example, binary data, comma delimited data, tab delimited data, structured query language (SQL) structures, etc.

In the illustrated example of FIG. 4, the smart NIC 322 includes the compute circuitry 414, the accelerator circuitry 416, and the dedicated telemetry circuitry 418. Each of the compute circuitry 414, the accelerator circuitry 416, and the dedicated telemetry circuitry 418 is coupled to the caching function execution circuitry 408. As such, the caching function execution circuitry 408 may offload caching function execution to one or more of the compute circuitry 414, the accelerator circuitry 416, or the dedicated telemetry circuitry 418. Accordingly, the smart NIC 322 enables complete hierarchical architecture that, using acceleration, allows developers and/or engineers to define different approximate content caching functions based on different types of metadata and different types of profiles.

The compute circuitry 414 can be implemented by processor circuitry. The accelerator circuitry 416 can be implemented by one or more DSPs, one or more microcontrollers, and/or integrated circuits such as one or more Application Specific Integrated Circuits (ASICs). In some examples, the accelerator circuitry 416 includes one or more analog or digital circuit(s), logic circuits, programmable processor(s), programmable controller(s), GPU(s), DSP(s), ASIC(s), programmable logic device(s) (PLD(s)), and/or field programmable logic device(s) (FPLD(s)). In the example of FIG. 4, the dedicated telemetry circuitry 418 can be implemented by one or more ASICs.

As described above, when a user and/or a device operated by a user requests access to a particular data stream, hierarchical smart NICS, can decide whether the data being cached in a particular hierarchy for that stream matches the requested data stream depending on a user profile for the user and metadata of the cached content. As such, exampled disclosed herein determine if a cached stream with a particular context is good enough for a requesting user given that user's SLA. Additionally, while the examples illustrated in FIGS. 3 and 4 describe hierarchical smart NICs with respect to 360° real-time video streaming, examples disclosed herein are likewise applicable to any real-time video streaming (e.g., two-dimensional (2D) real-time video streaming, three-dimensional (3D) real-time video streaming, 360° real-time video streaming, etc.) and/or other types of streaming content including AR, VR, and the like.

In some examples, the smart NIC 322 includes means for defining a caching function. For example, the means for defining a caching function may be implemented by the caching function interface circuitry 401. In some examples, the caching function interface circuitry 401 may be instantiated by processor circuitry such as the example processor circuitry 612 of FIG. 6. For instance, the caching function interface circuitry 401 may be instantiated by the example general purpose microprocessor circuitry 700 of FIG. 7 executing machine executable instructions. In some examples, the caching function interface circuitry 401 may be instantiated by hardware logic circuitry, which may be implemented by an ASIC or the FPGA circuitry 800 of FIG. 8 structured to perform operations corresponding to the machine readable instructions. Additionally or alternatively, the caching function interface circuitry 401 may be instantiated by any other combination of hardware, software, and/or firmware. For example, the caching function interface circuitry 401 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the smart NIC 322 includes means for interfacing with user profiles. For example, the means for interfacing with user profiles may be implemented by the user profile interface circuitry 402. In some examples, the user profile interface circuitry 402 may be instantiated by processor circuitry such as the example processor circuitry 612 of FIG. 6. For instance, the user profile interface circuitry 402 may be instantiated by the example general purpose microprocessor circuitry 700 of FIG. 7 executing machine executable instructions. In some examples, the user profile interface circuitry 402 may be instantiated by hardware logic circuitry, which may be implemented by an ASIC or the FPGA circuitry 800 of FIG. 8 structured to perform operations corresponding to the machine readable instructions. Additionally or alternatively, the user profile interface circuitry 402 may be instantiated by any other combination of hardware, software, and/or firmware. For example, the user profile interface circuitry 402 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the smart NIC 322 includes means for enforcing caching policy. For example, the means for enforcing caching policy may be implemented by the caching policy circuitry 404. In some examples, the caching policy circuitry 404 may be instantiated by processor circuitry such as the example processor circuitry 612 of FIG. 6. For instance, the caching policy circuitry 404 may be instantiated by the example general purpose microprocessor circuitry 700 of FIG. 7 executing machine executable instructions such as that implemented by at least blocks 502, 504, 510, 518, 522, 524, and 526 of FIG. 5. In some examples, the caching policy circuitry 404 may be instantiated by hardware logic circuitry, which may be implemented by an ASIC or the FPGA circuitry 800 of FIG. 8 structured to perform operations corresponding to the machine readable instructions. Additionally or alternatively, the caching policy circuitry 404 may be instantiated by any other combination of hardware, software, and/or firmware. For example, the caching policy circuitry 404 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the smart NIC 322 includes means for managing user profiles. For example, the means for managing user profiles may be implemented by the user profile database management circuitry 406. In some examples, the user profile database management circuitry 406 may be instantiated by processor circuitry such as the example processor circuitry 612 of FIG. 6. For instance, the user profile database management circuitry 406 may be instantiated by the example general purpose microprocessor circuitry 700 of FIG. 7 executing machine executable instructions such as that implemented by at least blocks 506 and 508 of FIG. 5. In some examples, the user profile database management circuitry 406 may be instantiated by hardware logic circuitry, which may be implemented by an ASIC or the FPGA circuitry 800 of FIG. 8 structured to perform operations corresponding to the machine readable instructions. Additionally or alternatively, the user profile database management circuitry 406 may be instantiated by any other combination of hardware, software, and/or firmware. For example, the user profile database management circuitry 406 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the smart NIC 322 includes means for executing a caching function. For example, the means for executing a caching function may be implemented by the caching function execution circuitry 408. In some examples, the caching function execution circuitry 408 may be instantiated by processor circuitry such as the example processor circuitry 612 of FIG. 6. For instance, the caching function execution circuitry 408 may be instantiated by the example general purpose microprocessor circuitry 700 of FIG. 7 executing machine executable instructions such as that implemented by at least blocks 512, 514, 516, and 520 of FIG. 5. In some examples, the caching function execution circuitry 408 may be instantiated by hardware logic circuitry, which may be implemented by an ASIC or the FPGA circuitry 800 of FIG. 8 structured to perform operations corresponding to the machine readable instructions. Additionally or alternatively, the caching function execution circuitry 408 may be instantiated by any other combination of hardware, software, and/or firmware. For example, the caching function execution circuitry 408 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the smart NIC 322 includes means for accelerating. For example, the means for accelerating may be implemented by at least one of the compute circuitry 414, the accelerator circuitry 416, or the dedicated telemetry circuitry 418. In some examples, the at least one of the compute circuitry 414, the accelerator circuitry 416, or the dedicated telemetry circuitry 418 may be instantiated by processor circuitry such as the example processor circuitry 612 of FIG. 6. For instance, the at least one of the compute circuitry 414, the accelerator circuitry 416, or the dedicated telemetry circuitry 418 may be instantiated by the example general purpose microprocessor circuitry 700 of FIG. 7 executing machine executable instructions. In some examples, the at least one of the compute circuitry 414, the accelerator circuitry 416, or the dedicated telemetry circuitry 418 may be instantiated by hardware logic circuitry, which may be implemented by an ASIC or the FPGA circuitry 800 of FIG. 8 structured to perform operations corresponding to the machine readable instructions. Additionally or alternatively, the at least one of the compute circuitry 414, the accelerator circuitry 416, or the dedicated telemetry circuitry 418 may be instantiated by any other combination of hardware, software, and/or firmware. For example, the at least one of the compute circuitry 414, the accelerator circuitry 416, or the dedicated telemetry circuitry 418 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

While an example manner of implementing the smart NIC 322 of FIG. 3 is illustrated in FIG. 4, one or more of the elements, processes, and/or devices illustrated in FIG. 4 may be combined, divided, re-arranged, omitted, eliminated, and/or implemented in any other way. Further, the example caching function interface circuitry 401, the example user profile interface circuitry 402, the example caching policy circuitry 404, the example user profile database management circuitry 406, the example caching function execution circuitry 408, the example cache 410, the example caching function storage 412, the example compute circuitry 414, the example accelerator circuitry 416, the example dedicated telemetry circuitry 418, and/or, more generally, the example smart NIC 322 of FIG. 3, may be implemented by hardware alone or by hardware in combination with software and/or firmware. Thus, for example, any of the example caching function interface circuitry 401, the example user profile interface circuitry 402, the example caching policy circuitry 404, the example user profile database management circuitry 406, the example caching function execution circuitry 408, the example cache 410, the example caching function storage 412, the example compute circuitry 414, the example accelerator circuitry 416, the example dedicated telemetry circuitry 418, and/or, more generally, the example smart NIC 322 of FIG. 3, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). Further still, the example smart NIC 322 of FIG. 4 may include one or more elements, processes, and/or devices in addition to, or instead of, those illustrated in FIG. 4, and/or may include more than one of any or all of the illustrated elements, processes, and devices.

Figure 5:
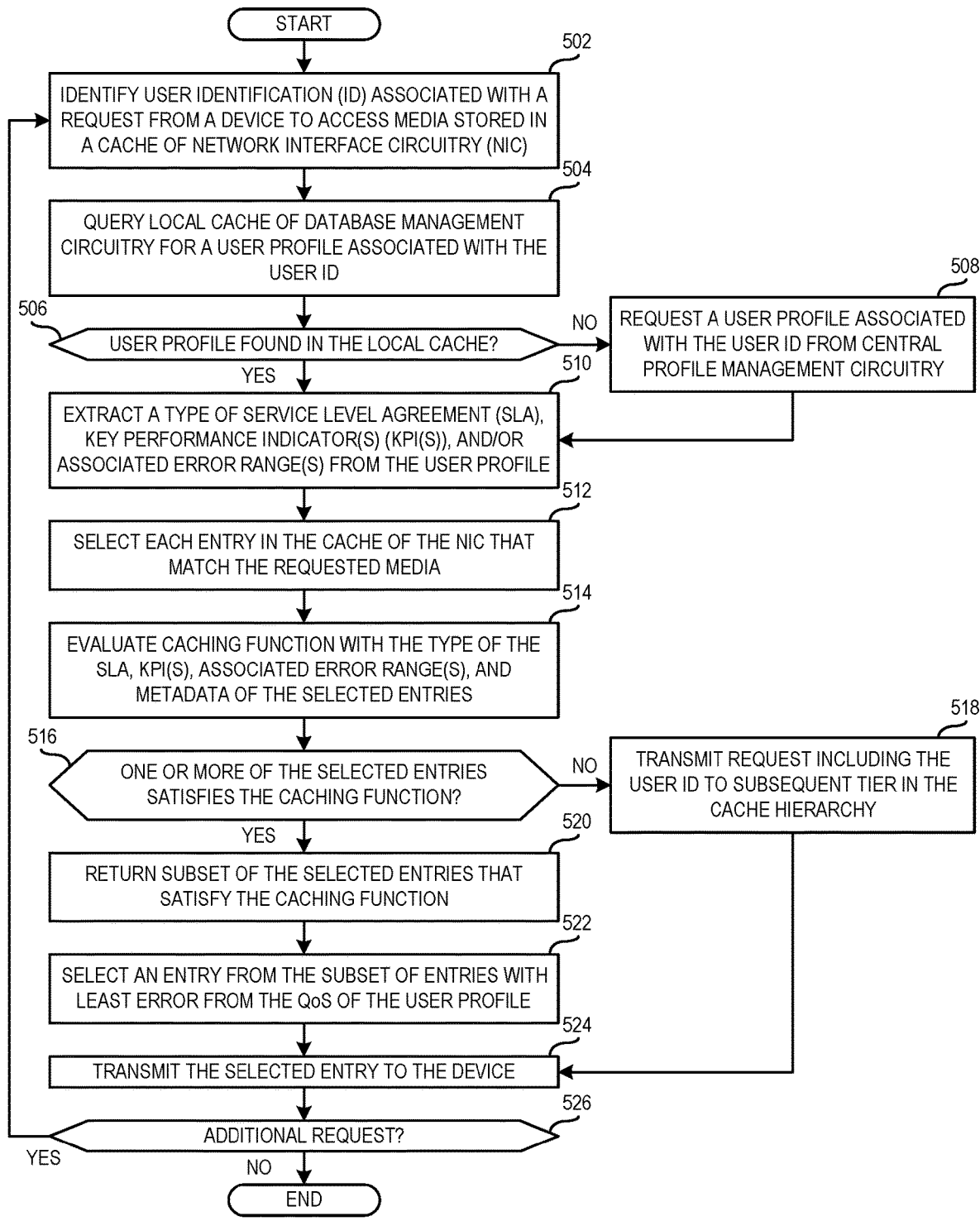
FIG. 5 is a flowchart representative of example machine readable instructions and/or example operations that may be executed by example processor circuitry to implement the smart network interface circuitry of FIG. 4 to cache media based on quality of service.

A flowchart representative of example hardware logic circuitry, machine readable instructions, hardware implemented state machines, and/or any combination thereof for implementing the smart NIC 322 of FIG. 4 is shown in FIG. 5. The machine readable instructions may be one or more executable programs or portion(s) of an executable program for execution by processor circuitry, such as the processor circuitry 612 shown in the example processor platform 600 discussed below in connection with FIG. 6 and/or the example processor circuitry discussed below in connection with FIGS. 7 and/or 8. The program may be embodied in software stored on one or more non-transitory computer readable storage media such as a compact disk (CD), a floppy disk, a hard disk drive (HDD), a solid-state drive (SSD), a digital versatile disk (DVD), a Blu-ray disk, a volatile memory (e.g., Random Access Memory (RAM) of any type, etc.), or a non-volatile memory (e.g., electrically erasable programmable read-only memory (EEPROM), FLASH memory, an HDD, an SSD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN)) gateway that may facilitate communication between a server and an endpoint client hardware device). Similarly, the non-transitory computer readable storage media may include one or more mediums located in one or more hardware devices. Further, although the example program is described with reference to the flowchart illustrated in FIG. 5, many other methods of implementing the example smart NIC 322 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU), etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIG. 5 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium and non-transitory computer readable storage medium are expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a," "an," "first," "second," etc.) do not exclude a plurality. The term "a" or "an" object, as used herein, refers to one or more of that object. The terms "a" (or "an"), "one or more," and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

FIG. 5 is a flowchart representative of example machine readable instructions and/or example operations that may be executed by example processor circuitry to implement the smart network interface circuitry of FIG. 4 to cache media based on quality of service. The machine readable instructions and/or the operations 500 of FIG. 5 begin at block 502, at which the caching policy circuitry 404 identifies a user identification (ID) associated with a request from a device to access media stored in a cache of the smart NIC 322. At block 504, the caching policy circuitry 404 queries a local cache of the user profile database management circuitry 406 for a user profile associated with the user ID.

In the illustrated example of FIG. 5, at block 506, the user profile database management circuitry 406 determines whether a user profile for the user ID is included in the local cache of the user profile database management circuitry 406. In response to the user profile database management circuitry 406 determining that a user profile for the user ID is not included in the local cache of the user profile database management circuitry 406 (block 506: NO), the machine readable instructions and/or the operations 500 proceed to block 508. In response to the user profile database management circuitry 406 determining that the user profile for the user ID is included in the local cache of the user profile database management circuitry 406 (block 506: NO), the machine readable instructions and/or the operations 500 proceed to block 510.

In the illustrated example of FIG. 5, at block 510, the caching policy circuitry 404 extracts a type of the SLA (e.g., a priority according to which the smart NIC 322 is to serve end users), key performance indicators (KPIs), and associated error range(s) from the user profile. At block 512, the caching function execution circuitry 408 selects entries in the cache 410 that match the requested stream (e.g., based on a tag entry of the media in the cache 410). At block 514, the caching function execution circuitry 408 evaluates the caching function with type of the SLA, KPI(s), associated error range(s), and/or metadata of the selected entries of the cache 410. In some examples, the caching function execution circuitry 408 determines the caching function based on type of the SLA, KPI(s), associated error range(s), and/or metadata of the selected entries of the cache 410. In some examples, the caching function execution circuitry 408 calculates the caching function based on type of the SLA, KPI(s), associated error range(s), and/or metadata of the selected entries of the cache 410.

In the illustrated example of FIG. 5, at block 516, the caching function execution circuitry 408 determines whether one or more of the selected entries satisfy the caching function. In response to the caching function execution circuitry 408 determining that one or more of the selected entries do not satisfy the caching function (block 516: NO), the machine readable instructions and/or operations 500 proceed to block 518. At block 518, the caching policy circuitry 404 transmits a request including the user ID to a subsequent tier in the cache hierarchy. In response to the caching function execution circuitry 408 determining that one or more of the selected entries satisfies the caching function (block 516: YES), the machine readable instructions and/or operations 500 proceed to block 520. At block 520, the caching function execution circuitry 408 returns a subset of the selected entries that satisfy the caching function.

In the illustrated example of FIG. 5, at block 522, the caching policy circuitry 404 selects an entry from the subset of the selected entries that satisfy the caching function with the least error from the QoS of the user profile. At block 524, the caching policy circuitry 404 transmits the selected entry to the device that requested the media. At block 526, the caching policy circuitry 404 determines whether there has been an additional request for media. In response to the caching policy circuitry 404 determining that there is an additional request (block 526: YES), the machine readable instructions and/or operation 500 return to block 502. In response to the caching policy circuitry 404 determining that there is not an additional request (block 526: NO), the machine readable instructions and/or operation 500 terminate.

Figure 6:
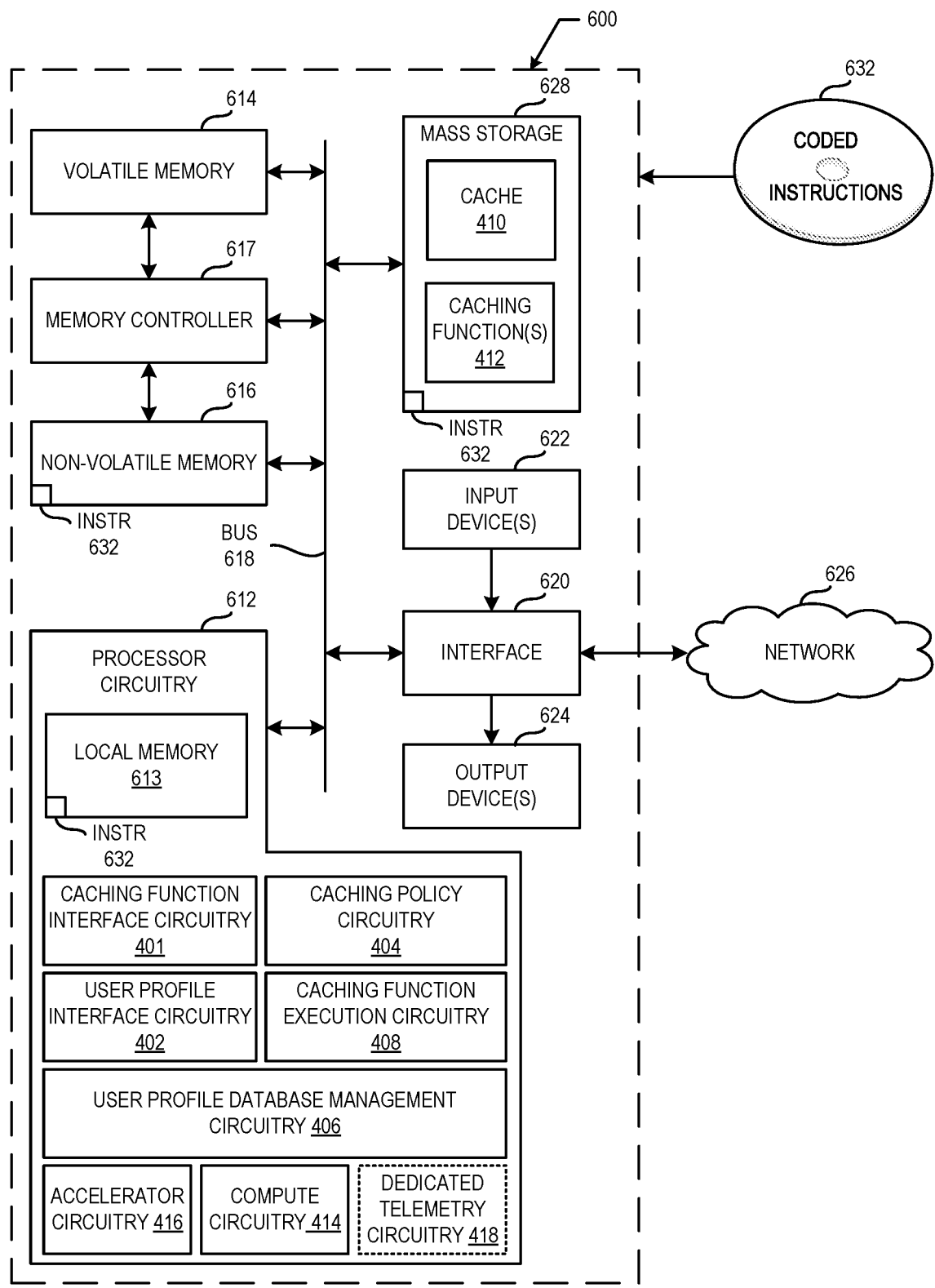
FIG. 6 is a block diagram of an example processing platform including processor circuitry structured to execute the example machine readable instructions and/or the example operations of FIG. 5 to implement the smart network interface circuitry of FIG. 4.

FIG. 6 is a block diagram of an example processor platform 600 structured to execute and/or instantiate the machine readable instructions and/or the operations 500 of FIG. 5 to implement the smart NIC 322 of FIG. 3. The processor platform 600 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device.

The processor platform 600 of the illustrated example includes processor circuitry 612. The processor circuitry 612 of the illustrated example is hardware. For example, the processor circuitry 612 can be implemented by one or more integrated circuits, logic circuits, FPGAs, microprocessors, CPUs, GPUs, DSPs, and/or microcontrollers from any desired family or manufacturer. The processor circuitry 612 may be implemented by one or more semiconductor based (e.g., silicon based) devices. In this example, the processor circuitry 612 implements the example caching function interface circuitry 401, the example user profile interface circuitry 402, the example caching policy circuitry 404, the example user profile database management circuitry 406, the example caching function execution circuitry 408, the example compute circuitry 414, the example accelerator circuitry 416, and/or the example dedicated telemetry circuitry 418.

The processor circuitry 612 of the illustrated example includes a local memory 613 (e.g., a cache, registers, etc.). The processor circuitry 612 of the illustrated example is in communication with a main memory including a volatile memory 614 and a non-volatile memory 616 by a bus 618. The volatile memory 614 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 616 may be implemented by flash memory and/or any other desired type of memory device. Access to the main memory 614, 616 of the illustrated example is controlled by a memory controller 617.

The processor platform 600 of the illustrated example also includes interface circuitry 620. The interface circuitry 620 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 622 are connected to the interface circuitry 620. The input device(s) 622 permit(s) a user to enter data and/or commands into the processor circuitry 612. The input device(s) 622 can be implemented by, for example, an audio sensor, a microphone, a camera (still or video), a keyboard, a button, a mouse, a touchscreen, a track-pad, a trackball, an isopoint device, and/or a voice recognition system.

One or more output devices 624 are also connected to the interface circuitry 620 of the illustrated example. The output device(s) 624 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 620 of the illustrated example, thus, typically includes a graphics driver card, a graphics driver chip, and/or graphics processor circuitry such as a GPU.

The interface circuitry 620 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 626. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 600 of the illustrated example also includes one or more mass storage devices 628 to store software and/or data. Examples of such mass storage devices 628 include magnetic storage devices, optical storage devices, floppy disk drives, HDDs, CDs, Blu-ray disk drives, redundant array of independent disks (RAID) systems, solid state storage devices such as flash memory devices and/or SSDs, and DVD drives. In this example, the one or more mass storage device 628 implement the example cache 410 and the example caching function storage 412.

The machine executable instructions 632, which may be implemented by the machine readable instructions of FIG. 5, may be stored in the mass storage device 628, in the volatile memory 614, in the non-volatile memory 616, and/or on a removable non-transitory computer readable storage medium such as a CD or DVD.

Figure 7:
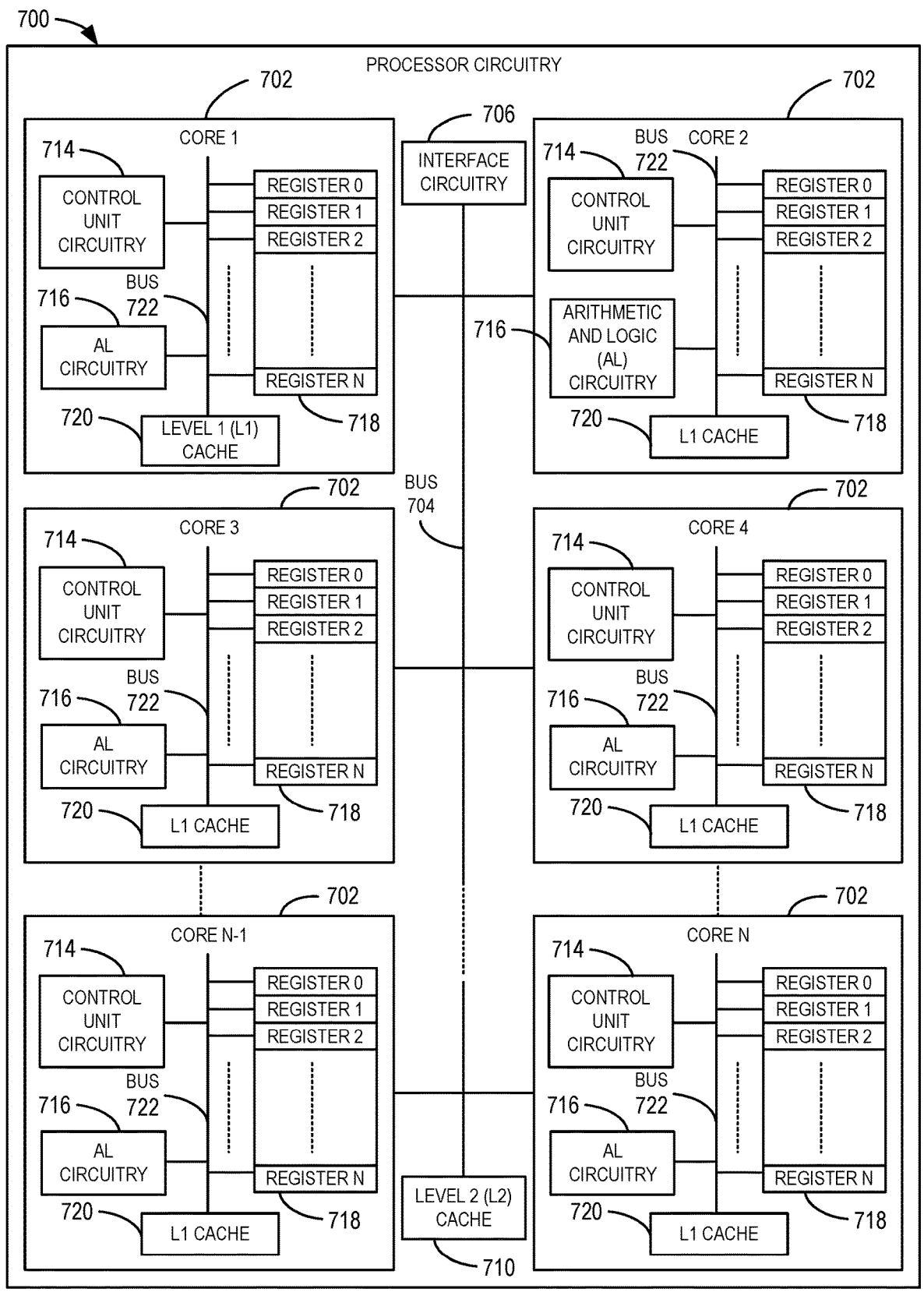
FIG. 7 is a block diagram of an example implementation of the processor circuitry of FIG. 6.

FIG. 7 is a block diagram of an example implementation of the processor circuitry 612 of FIG. 6. In this example, the processor circuitry 612 of FIG. 6 is implemented by a general purpose microprocessor circuitry 700. The general purpose microprocessor circuitry 700 executes some or all of the machine readable instructions of the flowchart of FIG. 5 to effectively instantiate the circuitry of FIG. 4 as logic circuits to perform the operations corresponding to those machine readable instructions. In some such examples, the circuitry of FIG. 4 is instantiated by the hardware circuits of the microprocessor circuitry 700 in combination with the instructions. For example, the microprocessor circuitry 700 may implement multi-core hardware circuitry such as a CPU, a DSP, a GPU, an XPU, etc. Although it may include any number of example cores 702 (e.g., 1 core), the microprocessor circuitry 700 of this example is a multi-core semiconductor device including N cores. The cores 702 of the microprocessor circuitry 700 may operate independently or may cooperate to execute machine readable instructions. For example, machine code corresponding to a firmware program, an embedded software program, or a software program may be executed by one of the cores 702 or may be executed by multiple ones of the cores 702 at the same or different times. In some examples, the machine code corresponding to the firmware program, the embedded software program, or the software program is split into threads and executed in parallel by two or more of the cores 702. The software program may correspond to a portion or all of the machine readable instructions and/or operations represented by the flowchart of FIG. 5.

The cores 702 may communicate by a first example bus 704. In some examples, the first bus 704 may implement a communication bus to effectuate communication associated with one(s) of the cores 702. For example, the first bus 704 may implement at least one of an Inter-Integrated Circuit (I2C) bus, a Serial Peripheral Interface (SPI) bus, a PCI bus, or a PCIe bus. Additionally or alternatively, the first bus 704 may implement any other type of computing or electrical bus. The cores 702 may obtain data, instructions, and/or signals from one or more external devices by example interface circuitry 706. The cores 702 may output data, instructions, and/or signals to the one or more external devices by the interface circuitry 706. Although the cores 702 of this example include example local memory 720 (e.g., Level 1 (L1) cache that may be split into an L1 data cache and an L1 instruction cache), the microprocessor circuitry 700 also includes example shared memory 710 that may be shared by the cores (e.g., Level 2 (L2_cache)) for high-speed access to data and/or instructions. Data and/or instructions may be transferred (e.g., shared) by writing to and/or reading from the shared memory 710. The local memory 720 of each of the cores 702 and the shared memory 710 may be part of a hierarchy of storage devices including multiple levels of cache memory and the main memory (e.g., the main memory 614, 616 of FIG. 6). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 702 may be referred to as a CPU, DSP, GPU, etc., or any other type of hardware circuitry. Each core 702 includes control unit circuitry 714, arithmetic and logic (AL) circuitry 716 (sometimes referred to as arithmetic and logic circuitry, an ALU, etc.), a plurality of registers 718, the L1 cache 720, and a second example bus 722. Other structures may be present. For example, each core 702 may include vector unit circuitry, single instruction multiple data (SIMD) unit circuitry, load/store unit (LSU) circuitry, branch/jump unit circuitry, floating-point unit (FPU) circuitry, etc. The control unit circuitry 714 (sometimes referred to as control circuitry) includes semiconductor-based circuits structured to control data movement (e.g., coordinate data movement) within the corresponding core 702. The AL circuitry 716 includes semiconductor-based circuits structured to perform one or more mathematic and/or logic operations on the data within the corresponding core 702. The AL circuitry 716 of some examples performs integer based operations. In other examples, the AL circuitry 716 also performs floating point operations. In yet other examples, the AL circuitry 716 may include first AL circuitry that performs integer based operations and second AL circuitry that performs floating point operations. In some examples, the AL circuitry 716 may be referred to as an Arithmetic Logic Unit (ALU). The registers 718 are semiconductor-based structures to store data and/or instructions such as results of one or more of the operations performed by the AL circuitry 716 of the corresponding core 702. For example, the registers 718 may include vector register(s), SIMD register(s), general purpose register(s), flag register(s), segment register(s), machine specific register(s), instruction pointer register(s), control register(s), debug register(s), memory management register(s), machine check register(s), etc. The registers 718 may be arranged in a bank as shown in FIG. 7. Alternatively, the registers 718 may be organized in any other arrangement, format, or structure including distributed throughout the core 702 to shorten access time. The second bus 722 may implement at least one of an I2C bus, a SPI bus, a PCI bus, or a PCIe bus Each core 702 and/or, more generally, the microprocessor circuitry 700 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor circuitry 700 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 8:
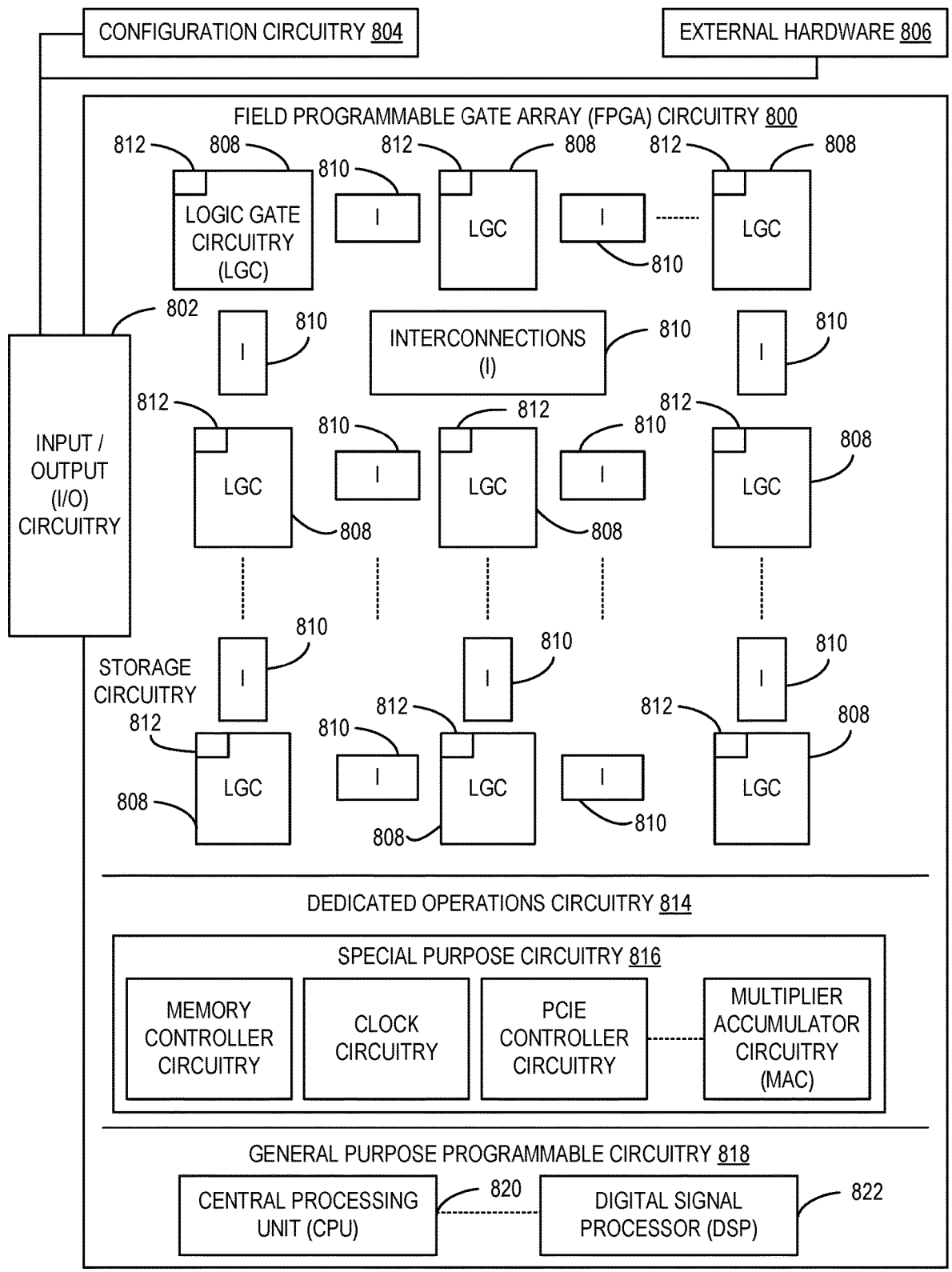
FIG. 8 is a block diagram of another example implementation of the processor circuitry of FIG. 6.

FIG. 8 is a block diagram of another example implementation of the processor circuitry 612 of FIG. 6. In this example, the processor circuitry 612 is implemented by FPGA circuitry 800. The FPGA circuitry 800 can be used, for example, to perform operations that could otherwise be performed by the example microprocessor circuitry 700 of FIG. 7 executing corresponding machine readable instructions. However, once configured, the FPGA circuitry 800 instantiates the machine readable instructions in hardware and, thus, can often execute the operations faster than they could be performed by a general purpose microprocessor executing the corresponding software.

More specifically, in contrast to the microprocessor circuitry 700 of FIG. 7 described above (which is a general purpose device that may be programmed to execute some or all of the machine readable instructions represented by the flowchart of FIG. 5 but whose interconnections and logic circuitry are fixed once fabricated), the FPGA circuitry 800 of the example of FIG. 8 includes interconnections and logic circuitry that may be configured and/or interconnected in different ways after fabrication to instantiate, for example, some or all of the machine readable instructions represented by the flowchart of FIG. 8. In particular, the FPGA circuitry 800 may be thought of as an array of logic gates, interconnections, and switches. The switches can be programmed to change how the logic gates are interconnected by the interconnections, effectively forming one or more dedicated logic circuits (unless and until the FPGA circuitry 800 is reprogrammed). The configured logic circuits enable the logic gates to cooperate in different ways to perform different operations on data received by input circuitry. Those operations may correspond to some or all of the software represented by the flowchart of FIG. 5. As such, the FPGA circuitry 800 may be structured to effectively instantiate some or all of the machine readable instructions of the flowchart of FIG. 5 as dedicated logic circuits to perform the operations corresponding to those software instructions in a dedicated manner analogous to an ASIC. Therefore, the FPGA circuitry 800 may perform the operations corresponding to the some or all of the machine readable instructions of FIG. 5 faster than the general purpose microprocessor can execute the same.

In the example of FIG. 8, the FPGA circuitry 800 is structured to be programmed (and/or reprogrammed one or more times) by an end user by a hardware description language (HDL) such as Verilog. The FPGA circuitry 800 of FIG. 8, includes example input/output (I/O) circuitry 802 to obtain and/or output data to/from example configuration circuitry 804 and/or external hardware (e.g., external hardware circuitry) 806. For example, the configuration circuitry 804 may implement interface circuitry that may obtain machine readable instructions to configure the FPGA circuitry 800, or portion(s) thereof. In some such examples, the configuration circuitry 804 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 806 may implement the microprocessor circuitry 700 of FIG. 7. The FPGA circuitry 800 also includes an array of example logic gate circuitry 808, a plurality of example configurable interconnections 810, and example storage circuitry 812. The logic gate circuitry 808 and interconnections 810 are configurable to instantiate one or more operations that may correspond to at least some of the machine readable instructions of FIG. 5 and/or other desired operations. The logic gate circuitry 808 shown in FIG. 8 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 808 to enable configuration of the electrical structures and/or the logic gates to form circuits to perform desired operations. The logic gate circuitry 808 may include other electrical structures such as look-up tables (LUTs), registers (e.g., flip-flops or latches), multiplexers, etc.

The interconnections 810 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 808 to program desired logic circuits.

The storage circuitry 812 of the illustrated example is structured to store result(s) of the one or more of the operations performed by corresponding logic gates. The storage circuitry 812 may be implemented by registers or the like. In the illustrated example, the storage circuitry 812 is distributed amongst the logic gate circuitry 808 to facilitate access and increase execution speed.

The example FPGA circuitry 800 of FIG. 8 also includes example Dedicated Operations Circuitry 814. In this example, the Dedicated Operations Circuitry 814 includes special purpose circuitry 816 that may be invoked to implement commonly used functions to avoid the need to program those functions in the field. Examples of such special purpose circuitry 816 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 800 may also include example general purpose programmable circuitry 818 such as an example CPU 820 and/or an example DSP 822. Other general purpose programmable circuitry 818 may additionally or alternatively be present such as a GPU, an XPU, etc., that can be programmed to perform other operations.

Although FIGS. 7 and 8 illustrate two example implementations of the processor circuitry 612 of FIG. 6, many other approaches are contemplated. For example, as mentioned above, modern FPGA circuitry may include an on-board CPU, such as one or more of the example CPU 820 of FIG. 8. Therefore, the processor circuitry 612 of FIG. 6 may additionally be implemented by combining the example microprocessor circuitry 700 of FIG. 7 and the example FPGA circuitry 800 of FIG. 8. In some such hybrid examples, a first portion of the machine readable instructions represented by the flowchart of FIG. 5 may be executed by one or more of the cores 702 of FIG. 57 a second portion of the machine readable instructions represented by the flowchart of FIG. 5 may be executed by the FPGA circuitry 800 of FIG. 8, and/or a third portion of the machine readable instructions represented by the flowchart of FIG. 5 may be executed by an ASIC. It should be understood that some or all of the circuitry of FIG. 4 may, thus, be instantiated at the same or different times. Some or all of the circuitry may be instantiated, for example, in one or more threads executing concurrently and/or in series. Moreover, in some examples, some or all of the circuitry of FIG. 2 may be implemented within one or more virtual machines and/or containers executing on the microprocessor.

In some examples, the processor circuitry 612 of FIG. 6 may be in one or more packages. For example, the microprocessor circuitry 700 of FIG. 7 and/or the FPGA circuitry 800 of FIG. 8 may be in one or more packages. In some examples, an XPU may be implemented by the processor circuitry 612 of FIG. 8, which may be in one or more packages. For example, the XPU may include a CPU in one package, a DSP in another package, a GPU in yet another package, and an FPGA in still yet another package.

Figure 9:
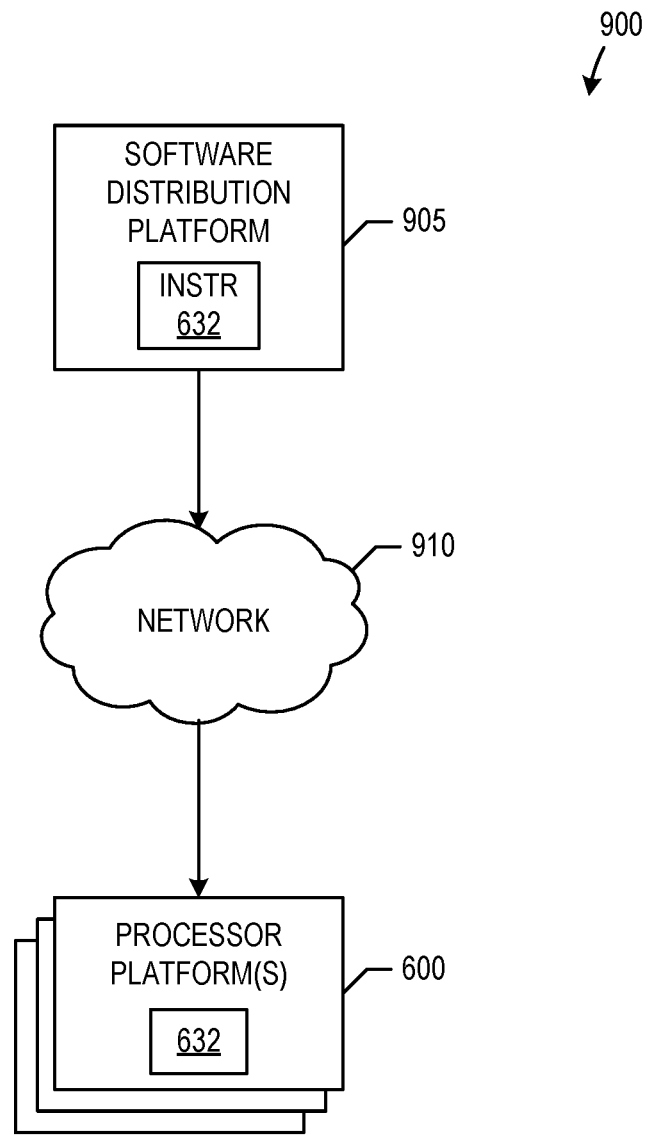
FIG. 9 is a block diagram of an example software distribution platform (e.g., one or more servers) to distribute software (e.g., software corresponding to the example machine readable instructions of FIG. 5) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 905 to distribute software such as the example machine readable instructions 632 of FIG. 6 to hardware devices owned and/or operated by third parties is illustrated in FIG. 9. The example software distribution platform 905 may be implemented by any computer server, data facility, cloud service, etc., capable of storing and transmitting software to other computing devices. The third parties may be customers of the entity owning and/or operating the software distribution platform 905. For example, the entity that owns and/or operates the software distribution platform 905 may be a developer, a seller, and/or a licensor of software such as the example machine readable instructions 632 of FIG. 6. The third parties may be consumers, users, retailers, OEMs, etc., who purchase and/or license the software for use and/or re-sale and/or sub-licensing. In the illustrated example, the software distribution platform 905 includes one or more servers and one or more storage devices. The storage devices store the machine readable instructions 632, which may correspond to the example machine readable instructions and/or operations 500 of FIG. 5, as described above. The one or more servers of the example software distribution platform 905 are in communication with a network 910, which may correspond to any one or more of the Internet and/or any of the example networks described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 632 from the software distribution platform 905. For example, the software, which may correspond to the example machine readable instructions and/or operations 500 of FIG. 5, may be downloaded to the example processor platform 600, which is to execute the machine readable instructions 632 to implement the smart NIC 322. In some example, one or more servers of the software distribution platform 905 periodically offer, transmit, and/or force updates to the software (e.g., the example machine readable instructions 632 of FIG. 6) to ensure improvements, patches, updates, etc., are distributed and applied to the software at the end user devices.

In further examples, any of the compute nodes or devices discussed with reference to the present Edge computing systems and environment may be fulfilled based on the components depicted in FIGS. 10A and 10B. Respective Edge compute nodes may be embodied as a type of device, appliance, computer, or other "thing" capable of communicating with other Edge, networking, or endpoint components. For example, an Edge compute device may be embodied as a personal computer, server, smartphone, a mobile compute device, a smart appliance, an in-vehicle compute system (e.g., a navigation system), a self-contained device having an outer case, shell, etc., or other device or system capable of performing the described functions.

Figure 10A:
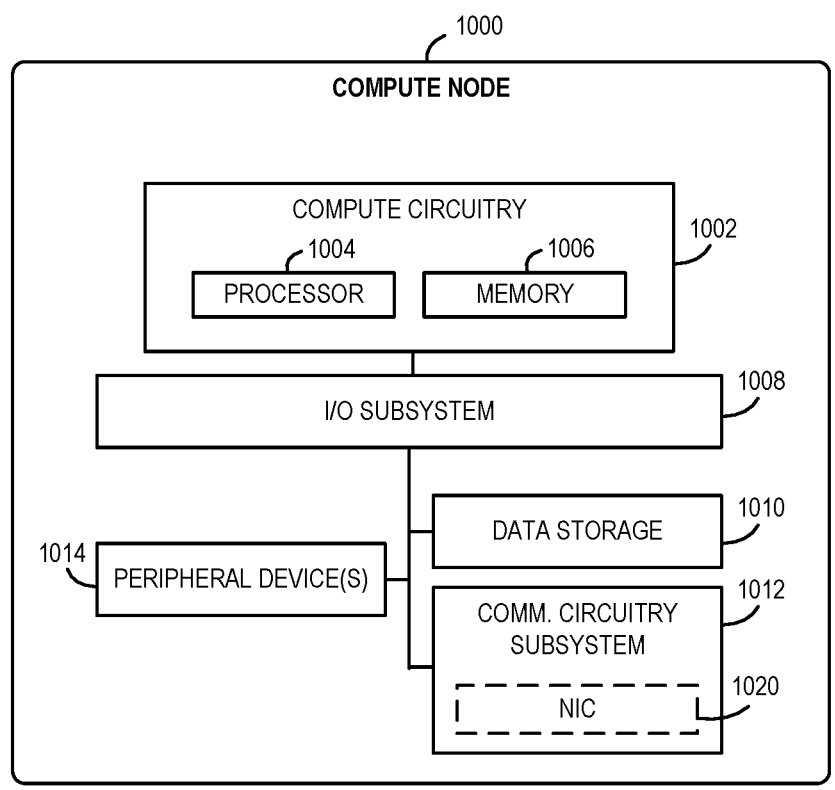
FIG. 10A provides an overview of example components for compute deployed at a compute node in an Edge computing system.

In the simplified example depicted in FIG. 10A, an Edge compute node 1000 includes a compute engine (also referred to herein as "compute circuitry") 1002, an input/output (I/O) subsystem (also referred to herein as "I/O circuitry") 1008, data storage (also referred to herein as "data storage circuitry") 1010, a communication circuitry subsystem 1012, and, optionally, one or more peripheral devices (also referred to herein as "peripheral device circuitry") 1014. In other examples, respective compute devices may include other or additional components, such as those typically found in a computer (e.g., a display, peripheral devices, etc.). Additionally, in some examples, one or more of the illustrative components may be incorporated in, or otherwise form a portion of, another component.

The compute node 1000 may be embodied as any type of engine, device, or collection of devices capable of performing various compute functions. In some examples, the compute node 1000 may be embodied as a single device such as an integrated circuit, an embedded system, a field-programmable gate array (FPGA), a system-on-a-chip (SOC), or other integrated system or device. In the illustrative example, the compute node 1000 includes or is embodied as a processor (also referred to herein as "processor circuitry") 1004 and a memory (also referred to herein as "memory circuitry") 1006. The processor 1004 may be embodied as any type of processor(s) capable of performing the functions described herein (e.g., executing an application). For example, the processor 1004 may be embodied as a multi-core processor(s), a microcontroller, a processing unit, a specialized or special purpose processing unit, or other processor or processing/controlling circuit.

In some examples, the processor 1004 may be embodied as, include, or be coupled to an FPGA, an application specific integrated circuit (ASIC), reconfigurable hardware or hardware circuitry, or other specialized hardware to facilitate performance of the functions described herein. Also in some examples, the processor 1004 may be embodied as a specialized x-processing unit (xPU) also known as a data processing unit (DPU), infrastructure processing unit (IPU), or network processing unit (NPU). Such an xPU may be embodied as a standalone circuit or circuit package, integrated within an SOC, or integrated with networking circuitry (e.g., in a SmartNIC, or enhanced SmartNIC), acceleration circuitry, storage devices, storage disks, or AI hardware (e.g., GPUs, programmed FPGAs, or ASICs tailored to implement an AI model such as a neural network). Such an xPU may be designed to receive, retrieve, and/or otherwise obtain programming to process one or more data streams and perform specific tasks and actions for the data streams (such as hosting microservices, performing service management or orchestration, organizing or managing server or data center hardware, managing service meshes, or collecting and distributing telemetry), outside of the CPU or general purpose processing hardware. However, it will be understood that an xPU, an SOC, a CPU, and other variations of the processor 1004 may work in coordination with each other to execute many types of operations and instructions within and on behalf of the compute node 1000.

The memory 1006 may be embodied as any type of volatile (e.g., dynamic random access memory (DRAM), etc.) or non-volatile memory or data storage capable of performing the functions described herein. Volatile memory may be a storage medium that requires power to maintain the state of data stored by the medium. Non-limiting examples of volatile memory may include various types of random access memory (RAM), such as DRAM or static random access memory (SRAM). One particular type of DRAM that may be used in a memory module is synchronous dynamic random access memory (SDRAM).

In an example, the memory device (e.g., memory circuitry) is any number of block addressable memory devices, such as those based on NAND or NOR technologies (for example, Single-Level Cell ("SLC"), Multi-Level Cell ("MLC"), Quad-Level Cell ("QLC"), Tri-Level Cell ("TLC"), or some other NAND). In some examples, the memory device(s) includes a byte-addressable write-in-place three dimensional crosspoint memory device, or other byte addressable write-in-place non-volatile memory (NVM) devices, such as single or multi-level Phase Change Memory (PCM) or phase change memory with a switch (PCMS), NVM devices that use chalcogenide phase change material (for example, chalcogenide glass), resistive memory including metal oxide base, oxygen vacancy base and Conductive Bridge Random Access Memory (CB-RAM), nanowire memory, ferroelectric transistor random access memory (FeTRAM), magneto resistive random access memory (MRAM) that incorporates memristor technology, spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, a combination of any of the above, or other suitable memory. A memory device may also include a three-dimensional crosspoint memory device (e.g., Intel® 3D Xpoint™ memory), or other byte addressable write-in-place nonvolatile memory devices. The memory device may refer to the die itself and/or to a packaged memory product. In some examples, 3D crosspoint memory (e.g., Intel® 3D Xpoint™ memory) may include a transistor-less stackable cross point architecture in which memory cells sit at the intersection of word lines and bit lines and are individually addressable and in which bit storage is based on a change in bulk resistance. In some examples, all or a portion of the memory 1006 may be integrated into the processor 1004. The memory 1006 may store various software and data used during operation such as one or more applications, data operated on by the application(s), libraries, and drivers.

In some examples, resistor-based and/or transistor-less memory architectures include nanometer scale phase-change memory (PCM) devices in which a volume of phase-change material resides between at least two electrodes. Portions of the example phase-change material exhibit varying degrees of crystalline phases and amorphous phases, in which varying degrees of resistance between the at least two electrodes can be measured. In some examples, the phase-change material is a chalcogenide-based glass material. Such resistive memory devices are sometimes referred to as memristive devices that remember the history of the current that previously flowed through them. Stored data is retrieved from example PCM devices by measuring the electrical resistance, in which the crystalline phases exhibit a relatively lower resistance value(s) (e.g., logical "0") when compared to the amorphous phases having a relatively higher resistance value(s) (e.g., logical "1").

Example PCM devices store data for long periods of time (e.g., approximately 10 years at room temperature). Write operations to example PCM devices (e.g., set to logical "0", set to logical "1", set to an intermediary resistance value) are accomplished by applying one or more current pulses to the at least two electrodes, in which the pulses have a particular current magnitude and duration. For instance, a long low current pulse (SET) applied to the at least two electrodes causes the example PCM device to reside in a low-resistance crystalline state, while a comparatively short high current pulse (RESET) applied to the at least two electrodes causes the example PCM device to reside in a high-resistance amorphous state.

In some examples, implementation of PCM devices facilitates non-von Neumann computing architectures that enable in-memory computing capabilities. Generally speaking, traditional computing architectures include a central processing unit (CPU) communicatively connected to one or more memory devices via a bus. As such, a finite amount of energy and time is consumed to transfer data between the CPU and memory, which is a known bottleneck of von Neumann computing architectures. However, PCM devices minimize and, in some cases, eliminate data transfers between the CPU and memory by performing some computing operations in-memory. Stated differently, PCM devices both store information and execute computational tasks. Such non-von Neumann computing architectures may implement vectors having a relatively high dimensionality to facilitate hyperdimensional computing, such as vectors having 10,000 bits. Relatively large bit width vectors enable computing paradigms modeled after the human brain, which also processes information analogous to wide bit vectors.

The compute circuitry 1002 is communicatively coupled to other components of the compute node 1000 via the I/O subsystem 1008, which may be embodied as circuitry and/or components to facilitate input/output operations with the compute circuitry 1002 (e.g., with the processor 1004 and/or the main memory 1006) and other components of the compute circuitry 1002. For example, the I/O subsystem 1008 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some examples, the I/O subsystem 1008 may form a portion of a system-on-a-chip (SoC) and be incorporated, along with one or more of the processor 1004, the memory 1006, and other components of the compute circuitry 1002, into the compute circuitry 1002.

The one or more illustrative data storage devices/disks 1010 may be embodied as one or more of any type(s) of physical device(s) configured for short-term or long-term storage of data such as, for example, memory devices, memory, circuitry, memory cards, flash memory, hard disk drives (HDDs), solid-state drives (SSDs), and/or other data storage devices/disks. Individual data storage devices/disks 1010 may include a system partition that stores data and firmware code for the data storage device/disk 1010. Individual data storage devices/disks 1010 may also include one or more operating system partitions that store data files and executables for operating systems depending on, for example, the type of compute node 1000.

The communication circuitry 1012 may be embodied as any communication circuit, device, or collection thereof, capable of enabling communications over a network between the compute circuitry 1002 and another compute device (e.g., an Edge gateway of an implementing Edge computing system). The communication circuitry 1012 may be configured to use any one or more communication technology (e.g., wired or wireless communications) and associated protocols (e.g., a cellular networking protocol such a 3GPP 4G or 5G standard, a wireless local area network protocol such as IEEE 802.11/Wi-Fi®, a wireless wide area network protocol, Ethernet, Bluetooth®, Bluetooth Low Energy, a IoT protocol such as IEEE 802.15.4 or ZigBee®, low-power wide-area network (LPWAN) or low-power wide-area (LPWA) protocols, etc.) to effect such communication.

The illustrative communication circuitry 1012 includes a network interface controller (NIC) 1020, which may also be referred to as a host fabric interface (HFI). The NIC 1020 may be embodied as one or more add-in-boards, daughter cards, network interface cards, controller chips, chipsets, or other devices that may be used by the compute node 1000 to connect with another compute device (e.g., an Edge gateway node). In some examples, the NIC 1020 may be embodied as part of a system-on-a-chip (SoC) that includes one or more processors, or included on a multichip package that also contains one or more processors. In some examples, the NIC 1020 may include a local processor (not shown) and/or a local memory (not shown) that are both local to the NIC 1020. In such examples, the local processor of the NIC 1020 may be capable of performing one or more of the functions of the compute circuitry 1002 described herein. Additionally, or alternatively, in such examples, the local memory of the NIC 1020 may be integrated into one or more components of the client compute node at the board level, socket level, chip level, and/or other levels.

Additionally, in some examples, a respective compute node 1000 may include one or more peripheral devices 1014. Such peripheral devices 1014 may include any type of peripheral device found in a compute device or server such as audio input devices, a display, other input/output devices, interface devices, and/or other peripheral devices, depending on the particular type of the compute node 1000. In further examples, the compute node 1000 may be embodied by a respective Edge compute node (whether a client, gateway, or aggregation node) in an Edge computing system or like forms of appliances, computers, subsystems, circuitry, or other components.

Figure 10B:
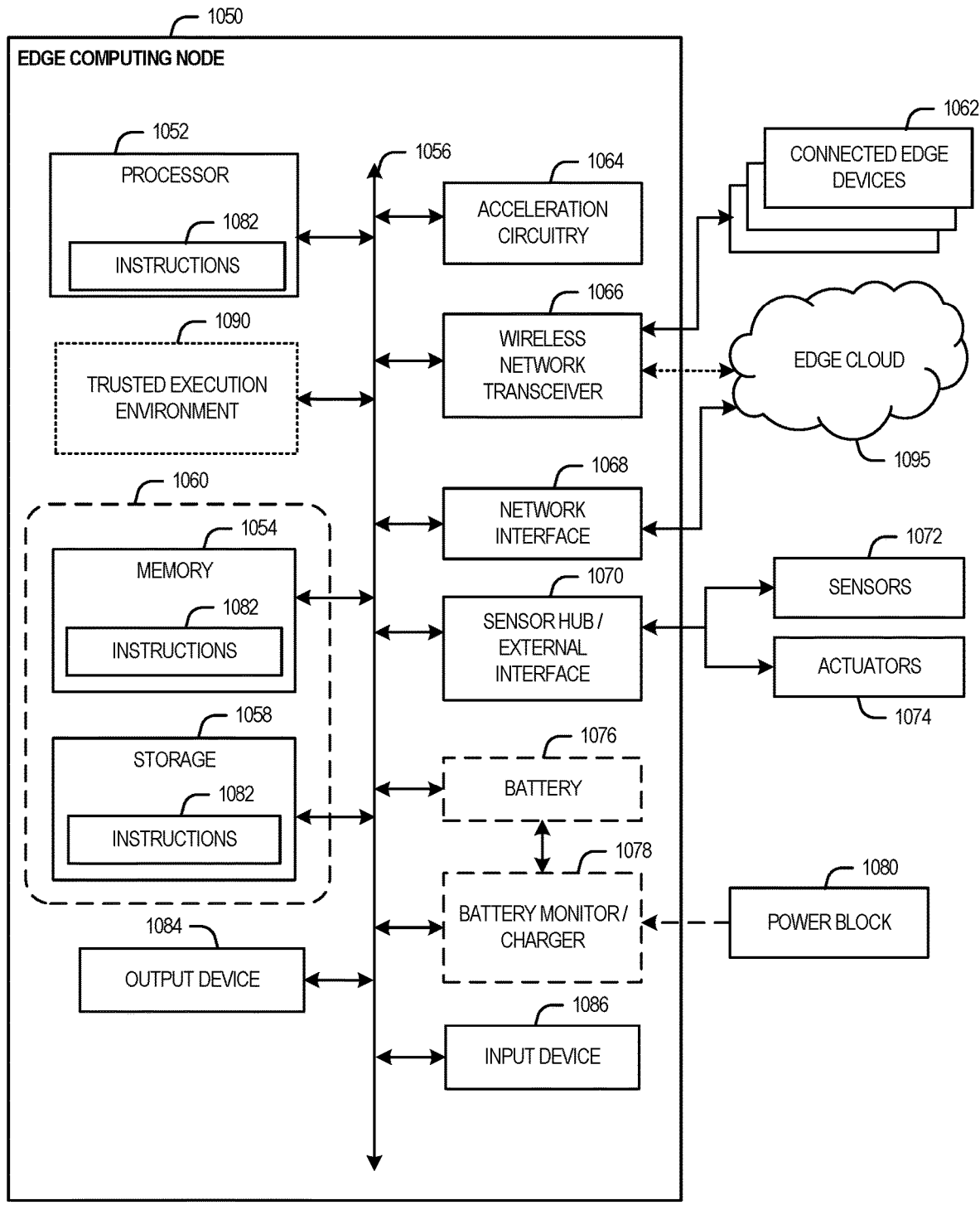
FIG. 10B provides a further overview of example components within a computing device in an Edge computing system.

In a more detailed example, FIG. 10B illustrates a block diagram of an example of components that may be present in an Edge computing node 1050 for implementing the techniques (e.g., operations, processes, methods, and methodologies) described herein. This Edge computing node 1050 provides a closer view of the respective components of node 1000 when implemented as or as part of a computing device (e.g., as a mobile device, a base station, server, gateway, etc.). The Edge computing node 1050 may include any combination of the hardware or logical components referenced herein, and it may include or couple with any device usable with an Edge communication network or a combination of such networks. The components may be implemented as integrated circuits (Ics), portions thereof, discrete electronic devices, or other modules, instruction sets, programmable logic or algorithms, hardware, hardware accelerators, software, firmware, or a combination thereof adapted in the Edge computing node 1050, or as components otherwise incorporated within a chassis of a larger system.

The Edge computing node 1050 may include processing circuitry in the form of a processor 1052, which may be a microprocessor, a multi-core processor, a multithreaded processor, an ultra-low voltage processor, an embedded processor, an xPU/DPU/IPU/NPU, special purpose processing unit, specialized processing unit, or other known processing elements. The processor 1052 may be a part of a system on a chip (SoC) in which the processor 1052 and other components are formed into a single integrated circuit, or a single package, such as the Edison™ or Galileo™ SoC boards from Intel Corporation, Santa Clara, California. As an example, the processor 1052 may include an Intel® Architecture Core™ based CPU processor, such as a Quark™, an Atom™, an i3, an i5, an i7, an i9, or an MCU-class processor, or another such processor available from Intel®. However, any number other processors may be used, such as available from Advanced Micro Devices, Inc. (AMD®) of Sunnyvale, California, a MIPS®-based design from MIPS Technologies, Inc. of Sunnyvale, California, an ARM®-based design licensed from ARM Holdings, Ltd. Or a customer thereof, or their licensees or adopters. The processors may include units such as an A5-A13 processor from Apple® Inc., a Snapdragon™ processor from Qualcomm® Technologies, Inc., or an OMAP™ processor from Texas Instruments, Inc. The processor 1052 and accompanying circuitry may be provided in a single socket form factor, multiple socket form factor, or a variety of other formats, including in limited hardware configurations or configurations that include fewer than all elements shown in FIG. 10B.

The processor 1052 may communicate with a system memory 1054 over an interconnect 1056 (e.g., a bus). Any number of memory devices may be used to provide for a given amount of system memory. As examples, the memory 1054 may be random access memory (RAM) in accordance with a Joint Electron Devices Engineering Council (JEDEC) design such as the DDR or mobile DDR standards (e.g., LPDDR, LPDDR2, LPDDR3, or LPDDR4). In particular examples, a memory component may comply with a DRAM standard promulgated by JEDEC, such as JESD79F for DDR SDRAM, JESD79-2F for DDR2 SDRAM, JESD79-3F for DDR3 SDRAM, JESD79-4A for DDR4 SDRAM, JES1109 for Low Power DDR (LPDDR), JES1109-2 for LPDDR2, JES1109-3 for LPDDR3, and JES1109-4 for LPDDR4. Such standards (and similar standards) may be referred to as DDR-based standards and communication interfaces of the storage devices that implement such standards may be referred to as DDR-based interfaces. In various implementations, the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems and so forth, a storage 1058 may also couple to the processor 1052 via the interconnect 1056. In an example, the storage 1058 may be implemented via a solid-state disk drive (SSDD). Other devices that may be used for the storage 1058 include flash memory cards, such as Secure Digital (SD) cards, microSD cards, eXtreme Digital (XD) picture cards, and the like, and Universal Serial Bus (USB) flash drives. In an example, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory.

In low power implementations, the storage 1058 may be on-die memory or registers associated with the processor 1052. However, in some examples, the storage 1058 may be implemented using a micro hard disk drive (HDD). Further, any number of new technologies may be used for the storage 1058 in addition to, or instead of, the technologies described, such resistance change memories, phase change memories, holographic memories, or chemical memories, among others.

The components may communicate over the interconnect 1056. The interconnect 1056 may include any number of technologies, including industry standard architecture (ISA), extended ISA (EISA), peripheral component interconnect (PCI), peripheral component interconnect extended (PCIx), PCI express (PCIe), or any number of other technologies. The interconnect 1056 may be a proprietary bus, for example, used in an SoC based system. Other bus systems may be included, such as an Inter-Integrated Circuit (I2C) interface, a Serial Peripheral Interface (SPI) interface, point to point interfaces, and a power bus, among others.

The interconnect 1056 may couple the processor 1052 to a transceiver 1066, for communications with the connected Edge devices 1062. The transceiver 1066 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the connected Edge devices 1062. For example, a wireless local area network (WLAN) unit may be used to implement Wi-Fi® communications in accordance with the Institute of Electrical and Electronics Engineers (IEEE) 802.11 standard. In addition, wireless wide area communications, e.g., according to a cellular or other wireless wide area protocol, may occur via a wireless wide area network (WWAN) unit.

The wireless network transceiver 1066 (or multiple transceivers) may communicate using multiple standards or radios for communications at a different range. For example, the Edge computing node 1050 may communicate with close devices, e.g., within about 10 meters, using a local transceiver based on Bluetooth Low Energy (BLE), or another low power radio, to save power. More distant connected Edge devices 1062, e.g., within about 50 meters, may be reached over ZigBee® or other intermediate power radios. Both communications techniques may take place over a single radio at different power levels or may take place over separate transceivers, for example, a local transceiver using BLE and a separate mesh transceiver using ZigBee®.

A wireless network transceiver 1066 (e.g., a radio transceiver) may be included to communicate with devices or services in a cloud (e.g., an Edge cloud 1095) via local or wide area network protocols. The wireless network transceiver 1066 may be a low-power wide-area (LPWA) transceiver that follows the IEEE 802.15.4, or IEEE 802.15.4g standards, among others. The Edge computing node 1050 may communicate over a wide area using LoRaWAN™ (Long Range Wide Area Network) developed by Semtech and the LoRa Alliance. The techniques described herein are not limited to these technologies but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the wireless network transceiver 1066, as described herein. For example, the transceiver 1066 may include a cellular transceiver that uses spread spectrum (SPA/SAS) communications for implementing high-speed communications. Further, any number of other protocols may be used, such as Wi-Fi® networks for medium speed communications and provision of network communications. The transceiver 1066 may include radios that are compatible with any number of 3GPP (Third Generation Partnership Project) specifications, such as Long Term Evolution (LTE) and $5^{th}$ Generation (5G) communication systems, discussed in further detail at the end of the present disclosure. A network interface controller (NIC) 1068 may be included to provide a wired communication to nodes of the Edge cloud 1095 or to other devices, such as the connected Edge devices 1062 (e.g., operating in a mesh). The wired communication may provide an Ethernet connection or may be based on other types of networks, such as Controller Area Network (CAN), Local Interconnect Network (LIN), DeviceNet, ControlNet, Data Highway+, PROFIBUS, or PROFINET, among many others. An additional NIC 1068 may be included to enable connecting to a second network, for example, a first NIC 1068 providing communications to the cloud over Ethernet, and a second NIC 1068 providing communications to other devices over another type of network.

Given the variety of types of applicable communications from the device to another component or network, applicable communications circuitry used by the device may include or be embodied by any one or more of acceleration circuitry 1064, the wireless network transceiver 1066, the additional NIC 1068, or the sensor hub or external interface 1070. Accordingly, in various examples, applicable means for communicating (e.g., receiving, transmitting, etc.) may be embodied by such communications circuitry.

The Edge computing node 1050 may include or be coupled to acceleration circuitry 1064, which may be embodied by one or more artificial intelligence (AI) accelerators, a neural compute stick, neuromorphic hardware, an FPGA, an arrangement of GPUs, an arrangement of xPUs/DPUs/IPU/NPUs, one or more SoCs, one or more CPUs, one or more digital signal processors, dedicated ASICs, or other forms of specialized processors or circuitry designed to accomplish one or more specialized tasks. These tasks may include AI processing (including machine learning, training, inferencing, and classification operations), visual data processing, network data processing, object detection, rule analysis, or the like. These tasks also may include the specific Edge computing tasks for service management and service operations discussed elsewhere in this document.

The interconnect 1056 may couple the processor 1052 to a sensor hub or external interface 1070 that is used to connect additional devices or subsystems. The devices may include sensors 1072, such as accelerometers, level sensors, flow sensors, optical light sensors, camera sensors, temperature sensors, global navigation system (e.g., GPS) sensors, pressure sensors, barometric pressure sensors, and the like. The sensor hub or external interface 1070 further may be used to connect the Edge computing node 1050 to actuators 1074, such as power switches, valve actuators, an audible sound generator, a visual warning device, and the like.

In some optional examples, various input/output (I/O) devices may be present within or connected to, the Edge computing node 1050. For example, a display or other output device 1084 may be included to show information, such as sensor readings or actuator position. An input device 1086, such as a touch screen or keypad may be included to accept input. An output device 1084 may include any number of forms of audio or visual display, including simple visual outputs such as binary status indicators (e.g., light-emitting diodes (LEDs)) and multi-character visual outputs, or more complex outputs such as display screens (e.g., liquid crystal display (LCD) screens), with the output of characters, graphics, multimedia objects, and the like being generated or produced from the operation of the Edge computing node 1050. A display or console hardware, in the context of the present system, may be used to provide output and receive input of an Edge computing system; to manage components or services of an Edge computing system; identify a state of an Edge computing component or service; or to conduct any other number of management or administration functions or service use cases.

A battery 1076 may power the Edge computing node 1050, although, in examples in which the Edge computing node 1050 is mounted in a fixed location, it may have a power supply coupled to an electrical grid, or the battery may be used as a backup or for temporary capabilities. The battery 1076 may be a lithium ion battery, or a metal-air battery, such as a zinc-air battery, an aluminum-air battery, a lithium-air battery, and the like.

A battery monitor/charger 1078 may be included in the Edge computing node 1050 to track the state of charge (SoCh) of the battery 1076, if included. The battery monitor/charger 1078 may be used to monitor other parameters of the battery 1076 to provide failure predictions, such as the state of health (SoH) and the state of function (SoF) of the battery 1076. The battery monitor/charger 1078 may include a battery monitoring integrated circuit, such as an LTC4020 or an LTC2990 from Linear Technologies, an ADT7488A from ON Semiconductor of Phoenix Arizona, or an IC from the UCD90xxx family from Texas Instruments of Dallas, TX The battery monitor/charger 1078 may communicate the information on the battery 1076 to the processor 1052 over the interconnect 1056. The battery monitor/charger 1078 may also include an analog-to-digital (ADC) converter that enables the processor 1052 to directly monitor the voltage of the battery 1076 or the current flow from the battery 1076. The battery parameters may be used to determine actions that the Edge computing node 1050 may perform, such as transmission frequency, mesh network operation, sensing frequency, and the like.

A power block 1080, or other power supply coupled to a grid, may be coupled with the battery monitor/charger 1078 to charge the battery 1076. In some examples, the power block 1080 may be replaced with a wireless power receiver to obtain the power wirelessly, for example, through a loop antenna in the Edge computing node 1050. A wireless battery charging circuit, such as an LTC4020 chip from Linear Technologies of Milpitas, California, among others, may be included in the battery monitor/charger 1078. The specific charging circuits may be selected based on the size of the battery 1076, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 1058 may include instructions 1082 in the form of software, firmware, or hardware commands to implement the techniques described herein. Although such instructions 1082 are shown as code blocks included in the memory 1054 and the storage 1058, it may be understood that any of the code blocks may be replaced with hardwired circuits, for example, built into an application specific integrated circuit (ASIC).

In an example, the instructions 1082 provided via the memory 1054, the storage 1058, or the processor 1052 may be embodied as a non-transitory, machine-readable medium 1060 including code to direct the processor 1052 to perform electronic operations in the Edge computing node 1050. The processor 1052 may access the non-transitory, machine-readable medium 1060 over the interconnect 1056. For instance, the non-transitory, machine-readable medium 1060 may be embodied by devices described for the storage 1058 or may include specific storage units such as storage devices and/or storage disks that include optical disks (e.g., digital versatile disk (DVD), compact disk (CD), CD-ROM, Blu-ray disk), flash drives, floppy disks, hard drives (e.g., SSDs), or any number of other hardware devices in which information is stored for any duration (e.g., for extended time periods, permanently, for brief instances, for temporarily buffering, and/or caching). The non-transitory, machine-readable medium 1060 may include instructions to direct the processor 1052 to perform a specific sequence or flow of actions, for example, as described with respect to the flowchart(s) and block diagram(s) of operations and functionality depicted above. As used herein, the terms "machine-readable medium" and "computer-readable medium" are interchangeable. As used herein, the term "non-transitory computer-readable medium" is expressly defined to include any type of computer readable storage device and/or storage disk and to exclude propagating signals and to exclude transmission media.

Also in a specific example, the instructions 1082 on the processor 1052 (separately, or in combination with the instructions 1082 of the machine readable medium 1060) may configure execution or operation of a trusted execution environment (TEE) 1090. In an example, the TEE 1090 operates as a protected area accessible to the processor 1052 for secure execution of instructions and secure access to data. Various implementations of the TEE 1090, and an accompanying secure area in the processor 1052 or the memory 1054 may be provided, for instance, through use of Intel® Software Guard Extensions (SGX) or ARM® TrustZone® hardware security extensions, Intel® Management Engine (ME), or Intel® Converged Security Manageability Engine (CSME). Other aspects of security hardening, hardware roots-of-trust, and trusted or protected operations may be implemented in the Edge computing node 1050 through the TEE 1090 and the processor 1052.

While the illustrated examples of FIG. 10A and FIG. 10B include example components for a compute node and a computing device, respectively, examples disclosed herein are not limited thereto. As used herein, a "computer" may include some or all of the example components of FIGS. 10A and/or 10B in different types of computing environments. Example computing environments include Edge computing devices (e.g., Edge computers) in a distributed networking arrangement such that particular ones of participating Edge computing devices are heterogenous or homogeneous devices. As used herein, a "computer" may include a personal computer, a server, user equipment, an accelerator, etc., including any combinations thereof. In some examples, distributed networking and/or distributed computing includes any number of such Edge computing devices as illustrated in FIGS. 10A and/or 10B, each of which may include different sub-components, different memory capacities, I/O capabilities, etc. For example, because some implementations of distributed networking and/or distributed computing are associated with particular desired functionality, examples disclosed herein include different combinations of components illustrated in FIGS. 10A and/or 10B to satisfy functional objectives of distributed computing tasks. In some examples, the term "compute node" or "computer" only includes the example processor 1004, memory 1006 and I/O subsystem 1008 of FIG. 10A. In some examples, one or more objective functions of a distributed computing task(s) rely on one or more alternate devices/structure located in different parts of an Edge networking environment, such as devices to accommodate data storage (e.g., the example data storage 1010), input/output capabilities (e.g., the example peripheral device(s) 1014), and/or network communication capabilities (e.g., the example NIC 1020).

In some examples, computers operating in a distributed computing and/or distributed networking environment (e.g., an Edge network) are structured to accommodate particular objective functionality in a manner that reduces computational waste. For instance, because a computer includes a subset of the components disclosed in FIGS. 10A and 10B, such computers satisfy execution of distributed computing objective functions without including computing structure that would otherwise be unused and/or underutilized. As such, the term "computer" as used herein includes any combination of structure of FIGS. 10A and/or 10B that is capable of satisfying and/or otherwise executing objective functions of distributed computing tasks. In some examples, computers are structured in a manner commensurate to corresponding distributed computing objective functions in a manner that downscales or upscales in connection with dynamic demand. In some examples, different computers are invoked and/or otherwise instantiated in view of their ability to process one or more tasks of the distributed computing request(s), such that any computer capable of satisfying the tasks proceed with such computing activity.

In the illustrated examples of FIGS. 10A and 10B, computing devices include operating systems. As used herein, an "operating system" is software to control example computing devices, such as the example Edge compute node 1000 of FIG. 10A and/or the example Edge computing node 1050 of FIG. 10B. Example operating systems include, but are not limited to consumer-based operating systems (e.g., Microsoft® Windows® 10, Google® Android® OS, Apple® Mac® OS, etc.). Example operating systems also include, but are not limited to industry-focused operating systems, such as real-time operating systems, hypervisors, etc. An example operating system on a first Edge compute node may be the same or different than an example operating system on a second Edge compute node. In some examples, the operating system invokes alternate software to facilitate one or more functions and/or operations that are not native to the operating system, such as particular communication protocols and/or interpreters. In some examples, the operating system instantiates various functionalities that are not native to the operating system. In some examples, operating systems include varying degrees of complexity and/or capabilities. For instance, a first operating system corresponding to a first Edge compute node includes a real-time operating system having particular performance expectations of responsivity to dynamic input conditions, and a second operating system corresponding to a second Edge compute node includes graphical user interface capabilities to facilitate end-user I/O.

Figure 11:
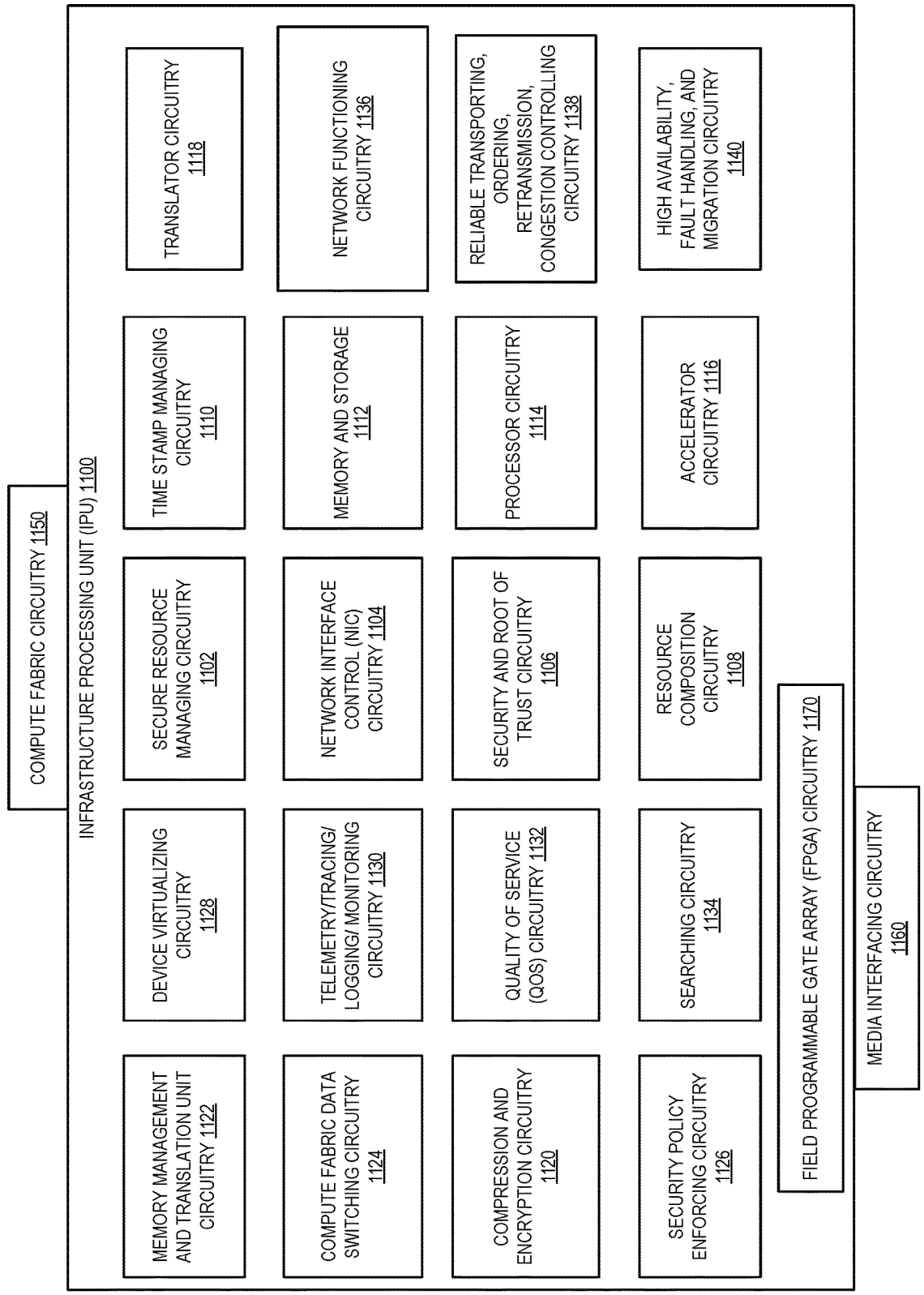
FIG. 11 is a schematic diagram of an example infrastructure processing unit (IPU).

FIG. 11 depicts an example of an infrastructure processing unit (IPU) 1100. Different examples of IPUs disclosed herein enable improved performance, management, security, and coordination functions between entities (e.g., cloud service providers), and enable infrastructure offload and/or communications coordination functions. As disclosed in further detail below, IPUs may be integrated with smart NICs and storage or memory (e.g., on a same die, system on chip (SoC), or connected dies) that are located at on-premises systems, base stations, gateways, neighborhood central offices, and so forth. Different examples of one or more IPUs disclosed herein can perform an application including any number of microservices, where each microservice runs in its own process and communicates using protocols (e.g., an HTTP resource API, message service or gRPC). Microservices can be independently deployed using centralized management of these services. A management system may be written in different programming languages and use different data storage technologies.

Furthermore, one or more IPUs can execute platform management, networking stack processing operations, security (crypto) operations, storage software, identity and key management, telemetry, logging, monitoring and service mesh (e.g., control how different microservices communicate with one another). The IPU 1100 can access an xPU to offload performance of various tasks. For instance, an IPU exposes XPU, storage, memory, and CPU resources and capabilities as a service that can be accessed by other microservices for function composition. This can improve performance and reduce data movement and latency. An IPU can perform capabilities such as those of a router, load balancer, firewall, TCP/reliable transport, a service mesh (e.g., proxy or API gateway), security, data-transformation, authentication, quality of service (QoS), security, telemetry measurement, event logging, initiating and managing data flows, data placement, or job scheduling of resources on an xPU, storage, memory, or CPU.

In the illustrated example of FIG. 11, the IPU 1100 includes or otherwise accesses secure resource managing circuitry 1102, network interface controller (NIC) circuitry 1104, security and root of trust circuitry 1106, resource composition circuitry 1108, time stamp managing circuitry 1110, memory and storage 1112, processing circuitry 1114, accelerator circuitry 1116, and/or translator circuitry 1118. Any number and/or combination of other structure(s) can be used such as but not limited to compression and encryption circuitry 1120, memory management and translation unit circuitry 1122, compute fabric data switching circuitry 1124, security policy enforcing circuitry 1126, device virtualizing circuitry 1128, telemetry, tracing, logging and monitoring circuitry 1130, quality of service circuitry 1132, searching circuitry 1134, network functioning circuitry (e.g., routing, firewall, load balancing, network address translating (NAT), etc.) 1136, reliable transporting, ordering, retransmission, congestion controlling circuitry 1138, and high availability, fault handling and migration circuitry 1140 shown in FIG. 11. Different examples can use one or more structures (components) of the example IPU 1100 together or separately. For example, compression and encryption circuitry 1120 can be used as a separate service or chained as part of a data flow with vSwitch and packet encryption.

In some examples, IPU 1100 includes a field programmable gate array (FPGA) 1170 structured to receive commands from an CPU, XPU, or application via an API and perform commands/tasks on behalf of the CPU, including workload management and offload or accelerator operations. The illustrated example of FIG. 11 may include any number of FPGAs configured and/or otherwise structured to perform any operations of any IPU described herein.

Example compute fabric circuitry 1150 provides connectivity to a local host or device (e.g., server or device (e.g., xPU, memory, or storage device)). Connectivity with a local host or device or smartNIC or another IPU is, in some examples, provided using one or more of peripheral component interconnect express (PCIe), ARM AXI, Intel® QuickPath Interconnect (QPI), Intel® Ultra Path Interconnect (UPI), Intel® On-Chip System Fabric (IOSF), Omnipath, Ethernet, Compute Express Link (CXL), Hyper-Transport, NVLink, Advanced Microcontroller Bus Architecture (AMBA) interconnect, OpenCAPI, Gen-Z, CCIX, Infinity Fabric (IF), and so forth. Different examples of the host connectivity provide symmetric memory and caching to enable equal peering between CPU, XPU, and IPU (e.g., via CXL.cache and CXL.mem).

Example media interfacing circuitry 1160 provides connectivity to a remote smartNIC or another IPU or service via a network medium or fabric. This can be provided over any type of network media (e.g., wired or wireless) and using any protocol (e.g., Ethernet, InfiniBand, Fiber channel, ATM, to name a few).

In some examples, instead of the server/CPU being the primary component managing IPU 1100, IPU 1100 is a root of a system (e.g., rack of servers or data center) and manages compute resources (e.g., CPU, xPU, storage, memory, other IPUs, and so forth) in the IPU 1100 and outside of the IPU 1100. Different operations of an IPU are described below.

In some examples, the IPU 1100 performs orchestration to decide which hardware or software is to execute a workload based on available resources (e.g., services and devices) and considers service level agreements and latencies, to determine whether resources (e.g., CPU, xPU, storage, memory, etc.) are to be allocated from the local host or from a remote host or pooled resource. In examples when the IPU 1100 is selected to perform a workload, secure resource managing circuitry 1102 offloads work to a CPU, xPU, or other device and the IPU 1100 accelerates connectivity of distributed runtimes, reduce latency, CPU and increases reliability.

In some examples, secure resource managing circuitry 1102 runs a service mesh to decide what resource is to execute workload, and provide for L7 (application layer) and remote procedure call (RPC) traffic to bypass kernel altogether so that a user space application can communicate directly with the example IPU 1100 (e.g., IPU 1100 and application can share a memory space). In some examples, a service mesh is a configurable, low-latency infrastructure layer designed to handle communication among application microservices using application programming interfaces (APIs) (e.g., over remote procedure calls (RPCs)). The example service mesh provides fast, reliable, and secure communication among containerized or virtualized application infrastructure services. The service mesh can provide critical capabilities including, but not limited to service discovery, load balancing, encryption, observability, traceability, authentication and authorization, and support for the circuit breaker pattern.

In some examples, infrastructure services include a composite node created by an IPU at or after a workload from an application is received. In some cases, the composite node includes access to hardware devices, software using APIs, RPCs, gRPCs, or communications protocols with instructions such as, but not limited, to iSCSI, NVMe-oF, or CXL.

In some cases, the example IPU 1100 dynamically selects itself to run a given workload (e.g., microservice) within a composable infrastructure including an IPU, xPU, CPU, storage, memory, and other devices in a node.

In some examples, communications transit through media interfacing circuitry 1160 of the example IPU 1100 through a NIC/smartNIC (for cross node communications) or loopback back to a local service on the same host. Communications through the example media interfacing circuitry 1160 of the example IPU 1100 to another IPU can then use shared memory support transport between xPUs switched through the local IPUs. Use of IPU-to-IPU communication can reduce latency and jitter through ingress scheduling of messages and work processing based on service level objective (SLO).

For example, for a request to a database application that requires a response, the example IPU 1100 prioritizes its processing to minimize the stalling of the requesting application. In some examples, the IPU 1100 schedules the prioritized message request issuing the event to execute a SQL query database and the example IPU constructs microservices that issue SQL queries and the queries are sent to the appropriate devices or services.

From the foregoing, it will be appreciated that example systems, methods, apparatus, and articles of manufacture have been disclosed that cache media based on service level agreement type. Examples disclosed herein include a new type of hierarchical type of real-time data caching for edge architectures. Example systems, methods, apparatus, and articles of manufacture have been disclosed that exploit approximate data streams to improve the total cost of operation (including processing resource expenditure) attached to large scale deployments of real-time content streaming. Disclosed systems, methods, apparatus, and articles of manufacture improve the efficiency of using a computing device by enabling scalability in real-time content delivery networks. Disclosed systems, methods, apparatus, and articles of manufacture are accordingly directed to one or more improvement(s) in the operation of a machine such as a computer or other electronic and/or mechanical device.

Example methods, apparatus, systems, and articles of manufacture to cache media based on service level agreement type are disclosed herein. Further examples and combinations thereof include the following:

Example 1 includes an apparatus to cache media based on service level agreement (SLA) type, the apparatus comprising a cache storing the media, processor circuitry including one or more of at least one of a central processor unit (CPU), a graphics processor unit (GPU), or a digital signal processor (DSP), the at least one of the CPU, the GPU, or the DSP having control circuitry to control data movement within the processor circuitry, arithmetic and logic circuitry to perform one or more first operations corresponding to instructions, and one or more registers to store a first result of the one or more first operations, the instructions in the apparatus, a Field Programmable Gate Array (FPGA), the FPGA including first logic gate circuitry, a plurality of configurable interconnections, and storage circuitry, the first logic gate circuitry and interconnections to perform one or more second operations, the storage circuitry to store a second result of the one or more second operations, or Application Specific Integrated Circuitry (ASIC) including second logic gate circuitry to perform one or more third operations, the processor circuitry to perform at least one of the first operations, the second operations, or the third operations to instantiate caching function execution circuitry to evaluate a caching function with (A) a type of an SLA corresponding to a profile associated with a device requesting the media and (B) metadata corresponding to an entry of the cache corresponding to the media, the profile corresponding to an identification (ID), and caching policy circuitry to, in response to the caching function indicating that the metadata satisfies the SLA, cause transmission of the entry of the cache to the device that requested the media.

Example 2 includes the apparatus of example 1, wherein the caching policy circuitry is to identify the ID, the ID associated with the request from the device to access the media stored in the cache, and query a local cache of user profile database management circuitry for the profile associated with the ID.

Example 3 includes the apparatus of any of examples 1 or 2, wherein the caching function execution circuitry is to evaluate the caching function with the type of the SLA of the profile, a key performance indicator (KPI) of the profile, and an error range associated with the KPI.

Example 4 includes the apparatus of any of examples 1, 2, or 3, further including user profile database management circuitry to request the profile associated with the device from central profile management circuitry.

Example 5 includes the apparatus of any of examples 1, 2, 3, or 4, wherein the request is a first request, and the caching policy circuitry is to cause transmission of a second request including the ID to a subsequent tier of a hierarchy including the cache.

Example 6 includes the apparatus of any of examples 1, 2, 3, 4, or 5, wherein the media corresponds to a first type of media, the caching function is a first caching function, and second media of a second type corresponds to a second caching function.

Example 7 includes the apparatus of any of examples 1, 2, 3, 4, 5, or 6, wherein the media includes a real-time video stream.

Example 8 includes the apparatus of any of examples 1, 2, 3, 4, 5, 6, or 7, wherein the profile includes a user profile.

Example 9 includes a non-transitory computer readable medium comprising machine readable instructions which, when executed, cause processor circuitry to determine a caching function based on (A) a type of an SLA corresponding to a profile associated with a device requesting media and (B) metadata corresponding to an entry of a cache corresponding to the media, the profile corresponding to an identification (ID), and in response to the caching function indicating that the metadata satisfies the SLA, cause transmission of the entry of the cache to the device that requested the media.

Example 10 includes the non-transitory computer readable medium of example 9, wherein the instructions cause the processor circuitry to identify the ID, the ID associated with the request from the device to access the media stored in the cache, and query a local cache of user profile database management circuitry for the profile associated with the ID.

Example 11 includes the non-transitory computer readable medium of any of examples 9 or 10, wherein the instructions cause the processor circuitry to determine the caching function based on the type of the SLA of the profile, a key performance indicator (KPI) of the profile, and an error range associated with the KPI.

Example 12 includes the non-transitory computer readable medium of any of examples 9, 10, or 11, wherein the instructions cause the processor circuitry to request the profile associated with the device from central profile management circuitry.

Example 13 includes the non-transitory computer readable medium of any of examples 9, 10, 11, or 12, wherein the request is a first request, and the instructions cause the processor circuitry to cause transmission of a second request including the ID to a subsequent tier of a hierarchy including the cache.

Example 14 includes the non-transitory computer readable medium of any of examples 9, 10, 11, 12, or 13, wherein the media corresponds to a first type of media, the caching function is a first caching function, and second media of a second type corresponds to a second caching function.

Example 15 includes the non-transitory computer readable medium of any of examples 9, 10, 11, 12, 13, or 14, wherein the media includes a real-time video stream.

Example 16 includes the non-transitory computer readable medium of any of examples 9, 10, 11, 12, 13, 14, or 15, wherein the profile includes a user profile.

Example 17 includes an apparatus to cache media based on service level agreement (SLA) type, the apparatus comprising means for executing a caching function with (A) a type of an SLA corresponding to a profile associated with a device requesting the media and (B) metadata corresponding to an entry of a cache corresponding to the media, the profile corresponding to an identification (ID), and means for enforcing caching policy to, in response to the caching function indicating that the metadata satisfies the SLA, cause transmission of the entry of the cache to the device that requested the media.

Example 18 includes the apparatus of example 17, wherein the means for enforcing caching policy are to identify the ID, the ID associated with the request from the device to access the media stored in the cache, and query a local cache of means for managing user profiles for the profile associated with the ID.

Example 19 includes the apparatus of any of examples 17 or 18, wherein the means for executing the caching function are to execute the caching function with the type of the SLA of the profile, a key performance indicator (KPI) of the profile, and an error range associated with the KPI.

Example 20 includes the apparatus of any of examples 17, 18, or 19, further including means for managing user profiles to request the profile associated with the device from central profile management circuitry.

Example 21 includes the apparatus of any of examples 17, 18, 19, or 20, wherein the request is a first request, and the means for enforcing caching policy are to cause transmission of a second request including the ID to a subsequent tier of a hierarchy including the cache.

Example 22 includes the apparatus of any of examples 17, 18, 19, 20, or 21, wherein the media corresponds to a first type of media, the caching function is a first caching function, and second media of a second type corresponds to a second caching function.

Example 23 includes the apparatus of any of examples 17, 18, 19, 20, 21, or 22, wherein the media includes a real-time video stream.

Example 24 includes the apparatus of any of examples 17, 18, 19, 20, 21, 22, or 23, wherein the profile includes a user profile.

Example 25 includes a method for caching media based on service level agreement (SLA) type, the method comprising calculating a caching function based on (A) a type of an SLA corresponding to a profile associated with a device requesting the media and (B) metadata corresponding to an entry of a cache corresponding to the media, the profile corresponding to an identification (ID), and in response to the caching function indicating that the metadata satisfies the SLA, transmitting the entry of the cache to the device that requested the media.

Example 26 includes the method of example 25, further including identifying the ID, the ID associated with the request from the device to access the media stored in the cache, and querying a local cache of user profile database management circuitry for the profile associated with the ID.

Example 27 includes the method of any of examples 25 or 26, further including calculating the caching function based on the type of the SLA of the profile, a key performance indicator (KPI) of the profile, and an error range associated with the KPI.

Example 28 includes the method of any of examples 25, 26, or 27, further including requesting the profile associated with the device from central profile management circuitry.

Example 29 includes the method of any of examples 25, 26, 27, or 28, wherein the request is a first request, and the method further includes transmitting a second request including the ID to a subsequent tier of a hierarchy including the cache.

Example 30 includes the method of any of examples 25, 26, 27, 28, or 29, wherein the media corresponds to a first type of media, the caching function is a first caching function, and second media of a second type corresponds to a second caching function.

Example 31 includes the method of any of examples 25, 26, 27, 28, 29, or 30, wherein the media includes a real-time video stream.

Example 32 includes the method of any of examples 25, 26, 27, 28, 29, 30, or 31, wherein the profile includes a user profile.

Example 33 includes the apparatus of any of examples 1, 2, 3, 4, 5, 6, 7, or 8 wherein the device is a first device, the profile is a first profile, the ID is a first ID, the SLA is a first SLA, and the caching policy circuitry is to, in response to determining that a second device requesting the media is associated with a second profile having second ID and corresponding to a second SLA of the type, cause transmission of the entry of the cache to the second device.

Example 34 includes the non-transitory computer readable medium of any of examples 9, 10, 11, 12, 13, 14, 15, or 16 wherein the device is a first device, the profile is a first profile, the ID is a first ID, the SLA is a first SLA, and the instructions cause the processor circuitry to, in response to determining that a second device requesting the media is associated with a second profile having second ID and corresponding to a second SLA of the type, cause transmission of the entry of the cache to the second device.

Example 35 includes the apparatus of any of examples 17, 18, 19, 20, 21, 22, 23, or 24 wherein the means for enforcing caching policy are to, in response to determining that a second device requesting the media is associated with a second profile having second ID and corresponding to a second SLA of the type, cause transmission of the entry of the cache to the second device.

Example 36 includes the method of any of examples 25, 26, 27, 28, 29, 30, 31, or 32, wherein the device is a first device, the profile is a first profile, the ID is a first ID, the SLA is a first SLA, and the method further includes, in response to determining that a second device requesting the media is associated with a second profile having second ID and corresponding to a second SLA of the type, transmitting the entry of the cache to the second device.

The following claims are hereby incorporated into this Detailed Description by this reference. Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

What is claimed is:

1. An apparatus comprising:
   a cache including media;
   instructions; and
   at least one processor circuit to be programmed by the instructions to
   evaluate a caching function corresponding to the media with (A) a key performance indicator (KPI) corresponding to a profile associated with a device requesting the media, (B) a permitted error range for the KPI, and (C) metadata identifying a value for the KPI for a portion of the media stored in the cache; and
   after the caching function indicates that the value for the KPI is within the permitted error range, cause transmission of the portion of the media to the device that requested the media.

2. The apparatus of claim 1, wherein one or more of the at least one processor circuit is to:
  identify an identification (ID) associated with the request from the device to access the media; and
  query a local for the profile associated with the ID.

3. The apparatus of claim 1, wherein one or more of the at least one processor circuit is to evaluate the caching function based on a type of a service level agreement of the profile, the KPI, and the permitted error range for the KPI.

4. The apparatus of claim 1, wherein one or more of the at least one processor circuit is to request the profile associated with the device from central profile management circuitry.

5. The apparatus of claim 1, wherein the request is a first request, and the one or more of the at least one processor circuit is to cause transmission of a second request including an identification corresponding to the profile to a subsequent tier of a hierarchy including the cache.

6. The apparatus of claim 1, wherein the media corresponds to a first type of media, the caching function is a first caching function, and second media of a second type corresponds to a second caching function.

7. The apparatus of claim 1, wherein the media includes a real-time video stream.

8. The apparatus of claim 1, wherein the profile includes a user profile, and one or more of the at least one processor circuit includes:
  at least one of a central processor unit (CPU), a graphics processor unit (GPU), or a digital signal processor (DSP), the at least one of the CPU, the GPU, or the DSP having control circuitry to control data movement within one or more of the at least one processor circuit, arithmetic and logic circuitry, and one or more registers;
  a Field Programmable Gate Array (FPGA), the FPGA including first logic gate circuitry, a plurality of configurable interconnections, and storage circuitry; or
  Application Specific Integrated Circuitry (ASIC) including second logic gate circuitry.

9. A non-transitory computer readable medium comprising machine readable instructions to cause at least one processor circuit to:
  evaluate a caching function corresponding to media based on (A) a key performance indicator (KPI) corresponding to a profile associated with a device requesting the media, (B) a permitted error range for the KPI, and a value for the KPI for a portion of the media stored in a cache; and
  after the caching function indicates that the value for the KPI is within the permitted error range, cause transmission of the portion of the media to the device that requested the media.

10. The non-transitory computer readable medium of claim 9, wherein the instructions cause one or more of the at least one processor circuit to:
  identify an identification (ID) associated with the request from the device to access the media; and
  query a local cache for the profile associated with the ID.

11. The non-transitory computer readable medium of claim 9, wherein the instructions cause one or more of the at least one processor circuit to evaluate the caching function based on a type of service level agreement of the profile, the KPI, and the permitted error range for the KPI.

12. The non-transitory computer readable medium of claim 9, wherein the instructions cause one or more of the at least one processor circuit to request the profile associated with the device.

13. The non-transitory computer readable medium of claim 9, wherein the request is a first request, and the instructions cause one or more of the at least one processor circuit to cause transmission of a second request including an identification corresponding to the profile to a subsequent tier of a hierarchy including the cache.

14. The non-transitory computer readable medium of claim 9, wherein the media corresponds to a first type of media, the caching function is a first caching function, and second media of a second type corresponds to a second caching function.

15. An apparatus comprising:
  means for executing a caching function corresponding to media with (A) a key performance indicator (KPI) corresponding to a profile associated with a device requesting the media, (B) a permitted error range for the KPI, and (C) a value for the KPI for a portion of the media stored in a cache; and
  means for enforcing caching policy to, after the caching function indicates that the value for the KPI is within the permitted error range, cause transmission of the portion of the media to the device that requested the media.

16. The apparatus of claim 15, wherein the means for enforcing the caching policy is to:
  identify an identification associated with the request from the device to access the media; and
  query means for managing user profiles for the profile associated with the ID.

17. The apparatus of claim 15, wherein the means for executing the caching function is to execute the caching function based on a type of a service level agreement of the profile, the KPI, and the permitted error range for the KPI.

18. The apparatus of claim 15, including means for managing user profiles, the managing means to request the profile associated with the device.

19. The apparatus of claim 15, wherein the request is a first request, and the means for enforcing the caching policy is to cause transmission of a second request including an identification corresponding to the profile to a subsequent tier of a hierarchy including the cache.

20. The apparatus of claim 15, wherein the media corresponds to a first type of media, the caching function is a first caching function, and second media of a second type corresponds to a second caching function.

21. A method comprising:
  calculating, by executing an instruction with at least one processor circuit, a caching function corresponding to media based on (A) a key performance indicator (KPI) corresponding to a profile associated with a device requesting the media, (B) a permitted error range for the KPI, and (C) a value for the KPI for a portion of the media stored in a cache; and
  after the caching function indicates that the value for the KPI is within the permitted error range, transmitting the portion of the media to the device that requested the media.

22. The method of claim 21, including:
  identifying an identification (ID) associated with the request from the device to access the media; and
  querying a local cache for the profile associated with the ID.

23. The method of claim 21, including calculating the caching function based on a type of a service level agreement of the profile, the KPI, and the permitted error range for the KPI.

24. The method of claim 21, including requesting the profile associated with the device.

25. The method of claim 21, wherein the request is a first request, and the method includes transmitting a second request including an identification corresponding to the profile to a subsequent tier of a hierarchy including the cache.

* * * * *

UNITED STATES PATENT AND TRADEMARK OFFICE
CERTIFICATE OF CORRECTION

| | | |
|---|---|---|
| PATENT NO. | : 12,483,735 B2 | Page 1 of 1 |
| APPLICATION NO. | : 17/559909 | |
| DATED | : November 25, 2025 | |
| INVENTOR(S) | : Guim Bernat | |

It is certified that error appears in the above-identified patent and that said Letters Patent is hereby corrected as shown below:

In the Claims

Column 45, Claim 9, Line 46, Delete: "KPI, and a" and Insert: --KPI, and (C) a--

Signed and Sealed this
Third Day of February, 2026

John A. Squires
*Director of the United States Patent and Trademark Office*